United States Patent
Bhunia et al.

(10) Patent No.: US 12,058,238 B2
(45) Date of Patent: Aug. 6, 2024

(54) PREDICTIVE JOINT COMPRESSION AND ENCRYPTION FOR IMAGES AND VIDEOS

(71) Applicant: University of Florida Research Foundation, Incorporated, Gainesville, FL (US)

(72) Inventors: Swarup Bhunia, Gainesville, FL (US); Prabuddha Chakraborty, Gainesville, FL (US); Jonathan William Cruz, Gainesville, FL (US); Tamzidul Hoque, Lawrence, KS (US); Toan Trung Nguyen, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 662 days.

(21) Appl. No.: 17/154,554

(22) Filed: Jan. 21, 2021

(65) Prior Publication Data

US 2021/0225039 A1    Jul. 22, 2021

Related U.S. Application Data

(60) Provisional application No. 62/964,584, filed on Jan. 22, 2020.

(51) Int. Cl.
*H04L 9/06*    (2006.01)
*G06N 20/00*   (2019.01)
(Continued)

(52) U.S. Cl.
CPC ............. *H04L 9/065* (2013.01); *G06N 20/00* (2019.01); *G06T 9/00* (2013.01); *G06V 10/762* (2022.01);
(Continued)

(58) Field of Classification Search
CPC ......... H04L 9/065; H04L 9/0819; H04L 9/12; H04L 2209/30; G06N 20/00; G06N 3/08;
(Continued)

(56) References Cited

U.S. PATENT DOCUMENTS 9,953,436 B2 * 4/2018 Li .................... H04N 19/119
11,392,634 B2 * 7/2022 Li ......................... G06F 16/58
(Continued)

*Primary Examiner* — Mia M Thomas
(74) *Attorney, Agent, or Firm* — ALSTON & BIRD LLP

(57) ABSTRACT

A joint compression and encryption system is configured to retrieve, from a local memory or image capture device, an image file including a first plurality of segments. The system is further configured to identify, for one or more segment of the first plurality of segments, a matching segment in a local segmentation repository. The system is further configured to compress remaining segments of the first plurality of segments for which no matching segment was identified into a compressed remaining segment set. The system is further configured to transmit, via an unsecure communication channel and to a second computing entity, the identifications of the matching segments, and the compressed remaining segment set. The system is further configured to, prior to retrieving the image file, perform a handshake or calibration process. The system is further configured to encrypt the matching segments using a key into an encrypted segment set and transmit the key to the second computing entity. In embodiments, the second computing entity, using the key, decrypts the encrypted segment set.

23 Claims, 25 Drawing Sheets

(51) Int. Cl.
    *G06T 9/00*    (2006.01)
    *G06V 10/762*    (2022.01)
    *G06V 10/764*    (2022.01)
    *G06V 10/82*    (2022.01)
    *G06V 40/16*    (2022.01)
    *H04L 9/08*    (2006.01)

(52) U.S. Cl.
    CPC ............ *G06V 10/764* (2022.01); *G06V 10/82* (2022.01); *G06V 40/161* (2022.01); *G06V 40/172* (2022.01); *H04L 9/0819* (2013.01)

(58) Field of Classification Search
    CPC ........ G06N 20/10; G06T 9/00; G06V 10/762; G06V 10/764; G06V 10/82; G06V 40/161; G06V 40/172; G06V 20/17; G06F 18/23; H04N 19/124; H04N 19/17; H04N 19/186; H04N 19/85; H04N 19/88
    See application file for complete search history.

(56) References Cited

U.S. PATENT DOCUMENTS

| | | | |
|---|---|---|---|
| 2012/0201462 A1* | 8/2012 | Chang .................. | H04N 19/122 382/248 |
| 2014/0064479 A1* | 3/2014 | Manikandan ....... | H03M 7/3062 380/28 |
| 2019/0113973 A1* | 4/2019 | Coleman ................. | G06F 3/011 |
| 2019/0191230 A1* | 6/2019 | Li ........................... | H03M 7/46 |

\* cited by examiner

```
< rows(16), cols(16),
  gridJump(16), blockSize_ML(16),
  block1_type(16), block2_type(16), ...,
  NumOfPointsInSubBlock-1(8),[x11,y11](8),[x12,y12](8), ...,
  NumOfPointsInSubBlock-2(8),[x21,y21](8),[x22,y22](8), ...,
  ...
  [r1,g1,b1](24), [r2,g2,b2](24), ..... >
```

FIG. 5

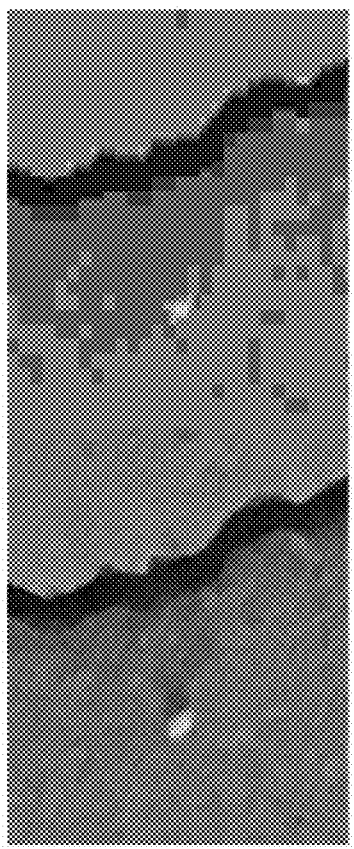
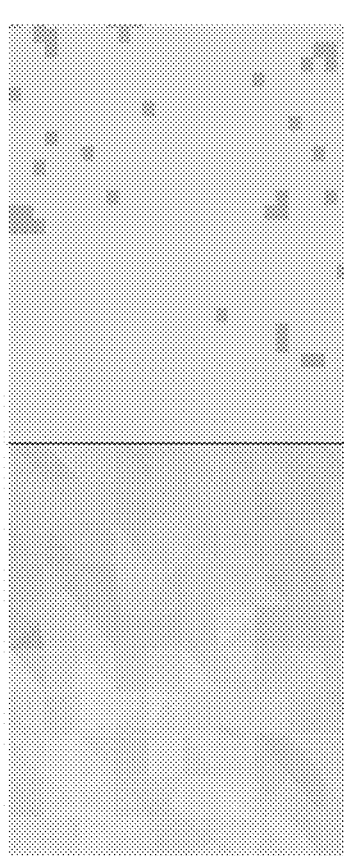
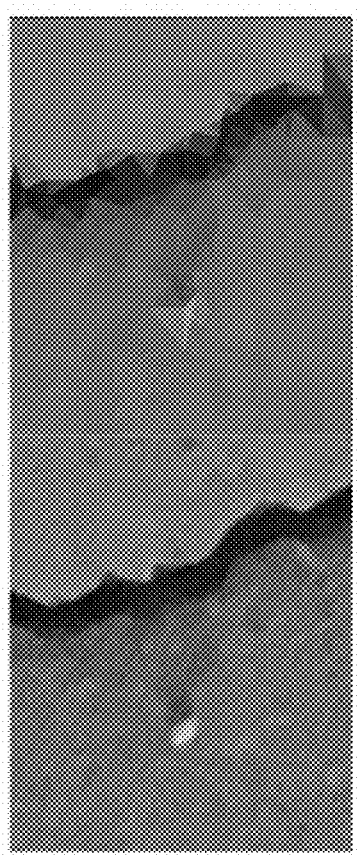
FIG. 12A
FIG. 12B
FIG. 12C
FIG. 12D

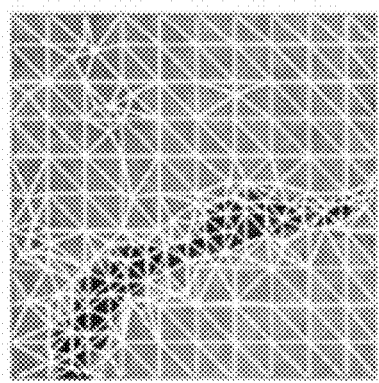
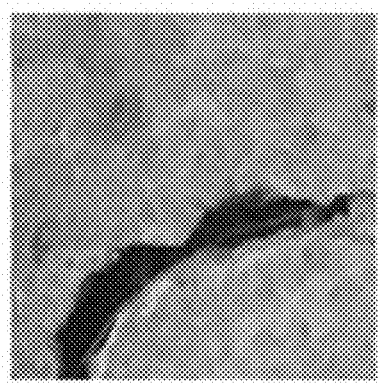
FIG. 16A
FIG. 16B

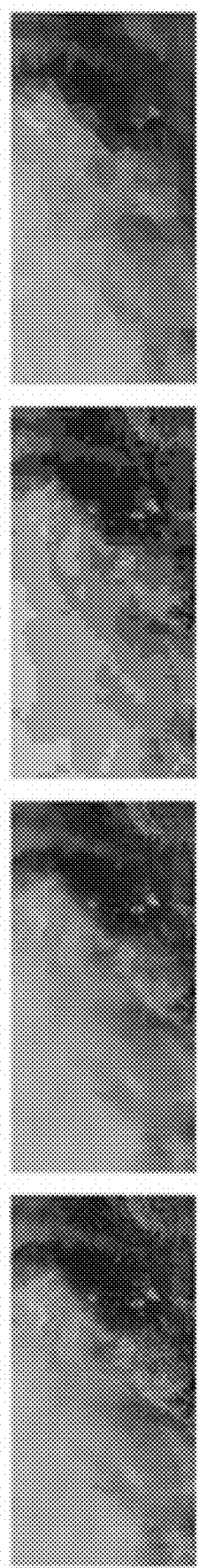
FIG. 20A (a) JPEG: QF-src (1.15 bpp, acc: 97.17%)
FIG. 20B (b) WebP: QF-1 (0.112 bpp, acc: 97.36%)
FIG. 20C (c) JPEG2k: QF-1 (0.073 bpp, acc: 95.38%)
FIG. 20D (d) MAGIC (0.045 bpp, acc: 95.25%)

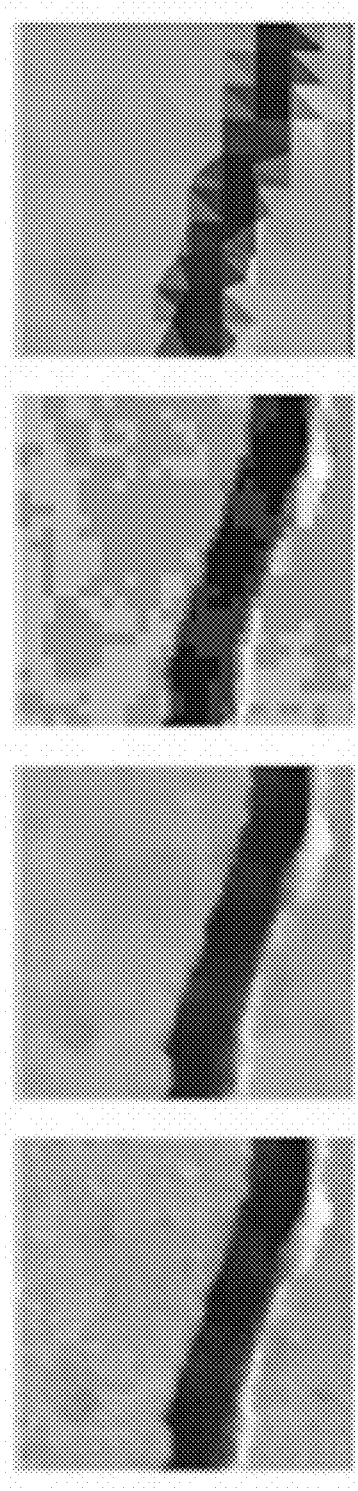
FIG. 22A (a) JPEG; QF-src (0.909 bpp, acc: 98.97%)
FIG. 22B (b) WebP; QF-1 (0.089 bpp, acc: 99.62%)
FIG. 22C (c) JP2K; QF-1 (0.117 bpp, acc: 98.15%)
FIG. 22D (d) MAGIC (0.048 bpp, acc: 97.91%)

PREDICTIVE JOINT COMPRESSION AND ENCRYPTION FOR IMAGES AND VIDEOS

CROSS-REFERENCE TO RELATED APPLICATIONS

The present application claims priority to U.S. Provisional Application Ser. No. 62/964,584, titled "PREDICTIVE JOINT COMPRESSION AND ENCRYPTION FOR IMAGES AND VIDEOS," filed Jan. 22, 2020, the contents of which are incorporated herein by reference in their entirety.

TECHNICAL FIELD

The present application relates generally to the field of compression and encryption systems, and more specifically to joint compression and encryption systems and methods for images and videos.

BACKGROUND

Transmitting encoded image files requires, on one hand, significant overhead, which results in higher operational costs. On the other hand, cyber security concerns require encrypting files that are being transmitted. Therefore, there is a need for encoding and compressing files simultaneously to avoid high overhead and reduce vulnerabilities.

The emergent ecosystems of intelligent edge devices in diverse Internet of Things (IoT) applications, from automatic surveillance to precision agriculture, increasingly rely on recording and processing variety of image data. Due to resource constraints (e.g., energy and communication bandwidth requirements), these applications require compressing the recorded images before transmission. For these applications, image compression commonly requires: (1) maintaining features for coarse-grain pattern recognition instead of the high-level details for human perception due to machine-to-machine communications; (2) high compression ratio that leads to improved energy and transmission efficiency; (3) large dynamic range of compression and an easy trade-off between compression factor and quality of reconstruction to accommodate a wide diversity of IoT applications as well as their time-varying energy/performance needs.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIG. 5 illustrates an exemplary encoding format, in accordance with some embodiments.

FIGS. 12A, 12B, 12C, 12D illustrate visual images of an exemplary surface with and without cracks, in accordance with some embodiments.

FIGS. 16A-16B illustrate exemplary DT guided segmentation for a sample building crack detection image, for use with embodiments described herein.

FIGS. 20A, 20B, 20C, 20D illustrate a comparison of source, and compressed fire detection images according to WebP, JPEG 2000, and embodiments herein.

FIGS. 22A, 22B, 22C, 22D show sample images from compressed datasets for each of JPEG 2000, WebP, and settings according to embodiments herein.

Figure 1A:
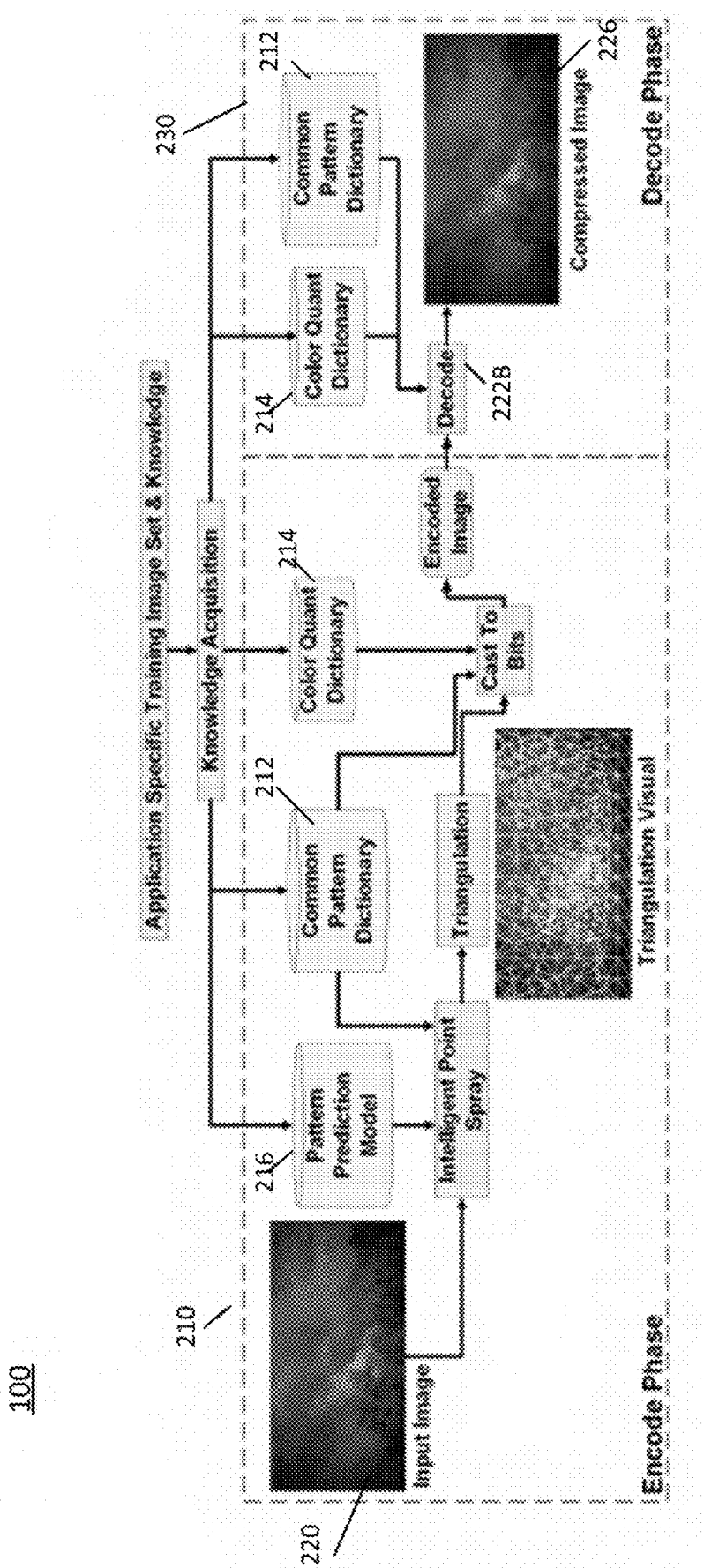
FIGS. 1A and 1B illustrate an exemplary joint compression and encryption system, in accordance with some embodiments.

In accordance with common practice some features illustrated in the drawings cannot be drawn to scale. Accordingly, the dimensions of some features can be arbitrarily expanded or reduced for clarity. In addition, some of the drawings cannot depict all of the components of a given system, method, or device. Finally, like reference numerals can be used to denote like features throughout the specification and figures.

SUMMARY

Embodiments of the present disclosure are directed to a method for joint compression and encryption. In embodiments, the method comprises retrieving, from a local memory or image capture device, an image file comprising a first plurality of segments. In embodiments, the method further comprises identifying, for one or more segment of the first plurality of segments, a matching segment in a local segmentation repository. In embodiments, the method further comprises compressing remaining segments of the first plurality of segments for which no matching segment was identified into a compressed remaining segment set. In embodiments, the method further comprises transmitting, via an unsecure communication channel and to a second computing entity, the identifications of the matching segments, and the compressed remaining segment set.

In embodiments, the method comprises a handshaking/calibration process performed prior to retrieving the image file. In embodiments, the handshaking/calibration process comprises generating a segmentation repository by applying a machine learning algorithm to a plurality of image files. In embodiments, the machine learning algorithm is trained to identify repeated segments in the plurality of image files. In embodiments, the handshaking/calibration process further comprises adding the repeated segments to the segmentation repository. In embodiments, the segmentation repository comprises a second plurality of segments.

In embodiments, the handshaking/calibration process further comprises generating a color quantization repository, using the machine learning algorithm, based at least in part on one or more colors of the second plurality of segments. In embodiments, the color quantization repository comprises a plurality of identifications associated with the second plurality of segments.

In embodiments, the handshaking/calibration process further comprises encoding each identification based on a count of the one or more colors.

In embodiments, the handshaking/calibration process further comprises transmitting, via a secure communication channel and to the second computing entity, the segmentation repository, and the color quantization repository.

In embodiments, the joint compression and encryption method comprises encrypting the matching segments using a key into an encrypted segment set, and transmitting the key to the second computing entity.

In embodiments, the joint compression and encryption method comprises determining, using the machine learning algorithm, one or more textural content in a training dataset and storing the textural content in a textural content segment in the segmentation repository.

In embodiments, the machine learning algorithm comprises an unsupervised pattern clustering algorithm.

In embodiments, the joint compression and encryption method comprises, upon determining that for at least one segment of the image file there is not a matching segment in the segmentation repository, identifying a substantially matching segment in the segmentation repository. In embodiments, the substantially matching segment comprises at least one of a color substantially matching a color of the at least one segment, a hue substantially matching a hue of the at least one segment, a pattern substantially matching a pattern of the at least one segment, or a texture substantially matching a texture of the at least one segment.

In embodiments, the joint compression and encryption method further comprises decoding, by the second computing entity, the encoded segments into decoded segments based at least in part on one or more of the segmentation repository, or the color quantization repository. In embodiments, the joint compression and encryption method further comprises retrieving, by the second computing entity, the image file based on the decoded segments and the compressed remaining segment set.

In embodiments, segmentation comprises predicting a spray pattern for each identified segment, performing an edge detection for each spray pattern, designating a spray point to each edge, triangulating the designated points into a plurality of triangles by connecting each set of three spray points in each spray pattern, iteratively dividing each triangle of the plurality of triangles that comprises a variation in texture, where the iteratively dividing comprises designating a point in a barycenter, and decoding the image file based on locations of the designated spray points and colors of each triangle of the plurality of triangles.

In embodiments, the segmentation further comprises detecting one or more regions of interest on the image file, designating an additional point to each edge of the one or more regions of interest and triangulating the additional point and the designated points.

In embodiments, the segmentation further comprises determining, using the machine learning algorithm, a color of a triangle based on one or more colors of each adjacent triangle and decoding the image file based on locations of the designated points and colors of each triangle.

In embodiments, the one or more regions of interest comprises at least one of: one or more objects, one or more edges, or one or more recognized faces.

In embodiments, the joint compression and encryption method further comprises, in response to retrieving a plurality of image files, compressing remaining segments of the second plurality of segments of each of image files for which no matching segment was identified into a compressed remaining segment set. In embodiments, the compressing is performed based at least in part on a differential data of one or more preceding image files.

In embodiments, the compression is performed in one of a time, a frequency, or a joint time-frequency domain.

In embodiments, the machine learning algorithm is used to determine the remaining segments of the second plurality of segments for compression.

In embodiments, data deemed unnecessary for analysis by an artificial intelligence computing entity is maintained at a low level of quality.

In embodiments, only those segments required for analysis by an artificial intelligence computing entity are maintained.

In embodiments, the machine learning algorithm is used for one or more of: identifying the matching segment in the segmentation repository, predicting a point spray pattern, identifying a substantially matching segment in the segmentation repository, or detecting one or more regions of interest on the image file.

In embodiments, the second computing entity, performs an image enhancement after recovery of the image file.

In embodiments, the second computing entity, using the key, decrypts the encrypted segment set.

DETAILED DESCRIPTION

Reference will now be made in detail to embodiments, examples of which are illustrated in the accompanying drawings. In the following detailed description, numerous specific details are set forth in order to provide a thorough understanding of some described embodiments. However, it will be apparent to one of ordinary skill in the art that the some described embodiments may be practiced without these specific details. In other instances, well-known methods, procedures, components, circuits, and networks have not been described in detail so as not to unnecessarily obscure aspects of the embodiments.

The terminology used in the description of some described embodiments herein is for the purpose of describing particular embodiments only and is not intended to be limiting. As used in the description of some described embodiments and the appended claims, the singular forms "a," "an," and "the" are intended to comprise the plural forms as well, unless the context clearly indicates otherwise. It will also be understood that the term "and/or" as used herein refers to and encompasses any and all possible combinations of one or more of the associated listed items. It will be further understood that the terms "comprises," "comprising," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In the Internet of Things (IoT) era, humans have been increasingly removed from the surveillance loop in favor of a connected ecosystem of edge devices performing vision-based tasks. Automatic analysis is the only viable option given the huge amount of data continuously collected from different IoT edge devices. For example, resource-constrained unmanned aerial vehicles (UAVs) or image sensors can be used as surveillance devices for detecting forest fires or infrastructure damages after natural disasters. In these scenarios, autonomous UAVs or edge devices collect data that may be sent to other edge devices or to the cloud for automated machine learning (ML) based analysis. According to the 2019 Embedded Markets Study, 43% of IoT applications incorporating advanced technologies are using embedded vision and 32% are using machine learning. However, using these IoT devices often requires meeting tight storage, energy and/or communication bandwidth constraints, while maintaining the effectiveness of surveillance.

Image compression can address these needs in edge devices that operate in constrained environments and at the same time reduce network traffic. Compressed images are easier to store and more energy efficient to transmit long-range. An ideal image compression technique for IoT applications should:
- Optimize for machine-to-machine communication and machine-based interpretation in diverse IoT applications—e.g., pattern recognition or feature extraction on the image. Visual perception by human users should be given less importance;
- Aim for minimizing the communication bandwidth as IoT is creating 1000× more dense networking requirements, often driven by image/video communication; and
- Gear towards minimizing the overall energy and space requirement on resource-constrained edge devices.

Standard image compression methods, such as JPEG, JPEG 2000, and WebP are tailored to maintain good human-perceivable visual quality and were not designed with IoT applications in mind. Properties of IoT applications which can be leveraged to obtain increased compression are as follows:

The image domain is biased based on the application and on each specific edge image sensor device. The bias can be divided into two categories: (1) color distribution bias, (2) common pattern bias. Patterns may be defined herein as segment outlines in an image. This information can be learned and utilized.

Depending on the application, specific entities of the images may hold greater value with respect to the rest of the image. Such applications, therefore, have a Region-of-Interest (ROI) bias which can be learned and utilized. Region-of-Interest may be defined herein as regions which contain entities of importance in an image. This location of this region can vary across images.

Coarse-grained ML tasks prevalent in IoT applications can tolerate extreme levels of compression. Most IoT applications designed to perform a particular automated vision task will have some bias in the images being captured and analyzed. The amount of bias will depend on the application and the sensory edge device in use. For a given application the images will have (1) a pixel color distribution bias depending on the environment where the image occurs and (2) a pattern bias due to prevalence of certain common objects in the images. Apart from the image set bias, the IoT application may have its own biases for certain objects and features relevant for the ML analysis task which are explained below.

Figures 15A, 15B:
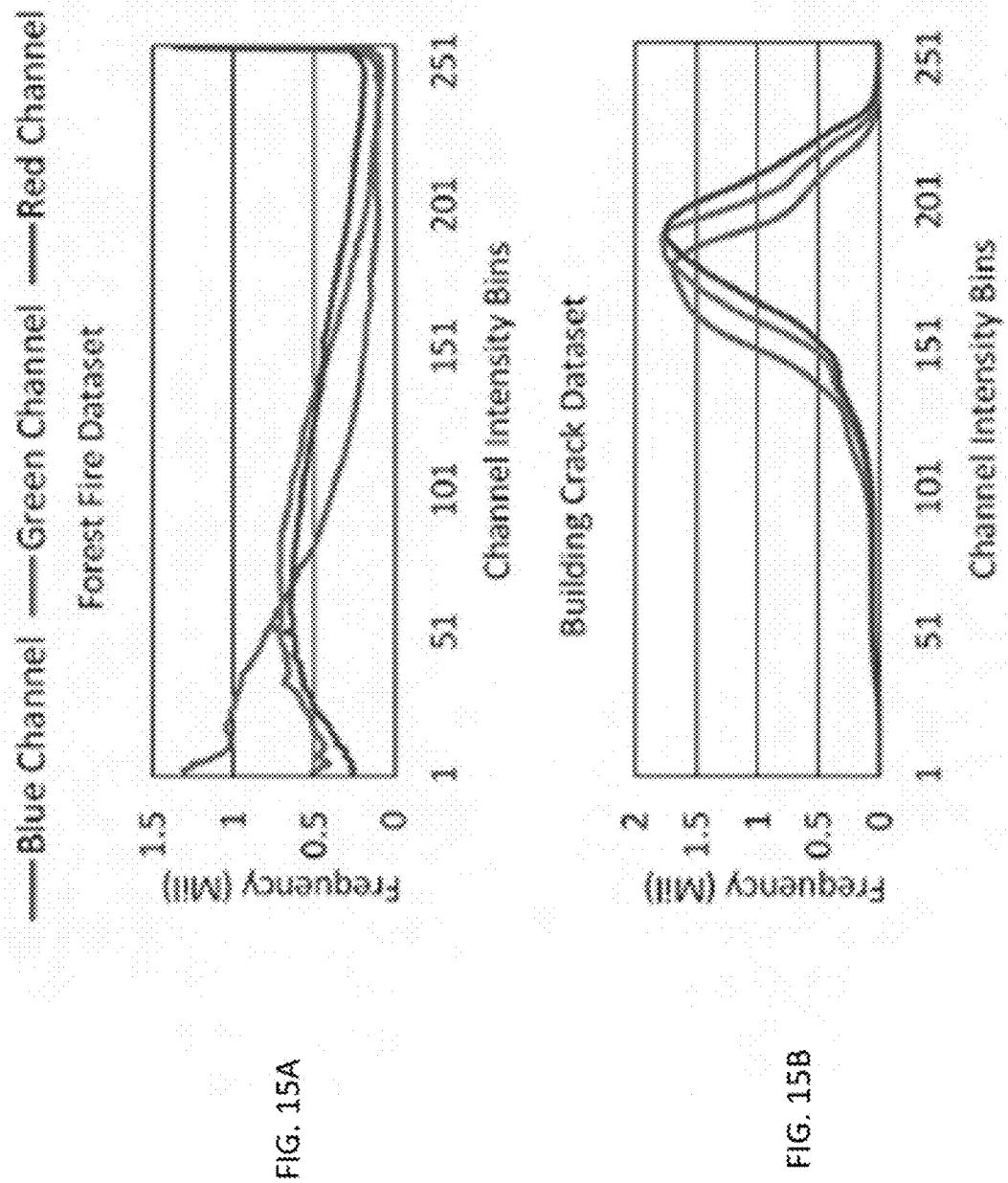
FIGS. 15A-15B illustrate exemplary Red-Green-Blue (RGB) pixel color distribution for forest fire and building crack detection datasets, for use with embodiments herein.

FIGS. 15A-15B illustrate exemplary Red-Green-Blue Pixel color distribution for forest fire and building crack detection datasets, for use with embodiments herein. The channel intensity bins range from 0 to 255 (8-bit per color channel). Red, Green and Blue lines represent R, G and B channels respectively. The frequency is reported in millions (Mil).

Color Distribution Bias

Image color bias will exist to an extent in any IoT domain-specific application. Apart from the application level color distribution bias, there may be bias attributed to the physical location of the device. For example, the objects and colors in view of a stationary camera or drone covering a routine path, will in most cases be consistent and therefore dominate the color space. Harnessing the bias for each device separately may be beneficial but in this paper, we limit our study to the application level image color distribution bias. Plotted are the pixel color distributions for the forest fire dataset (FIG. 15A) and the building crack dataset (FIG. 15B). The plot illustrates the number of occurrences (frequency) for each 8-bit color channel (Red, Green, Blue) across all pixels in the images. It is observed that certain regions of the Red, Green and Blue spectrum are more represented than others. For example, the building crack dataset shows clear bias for Red, Green, and Blue 8-bit values of 151-201. If embodiments herein can take advantage of this bias by limiting the color space tuned for the specific application then embodiments herein may be able to compress more.

Common Pattern Bias

Figures 17A, 17B:
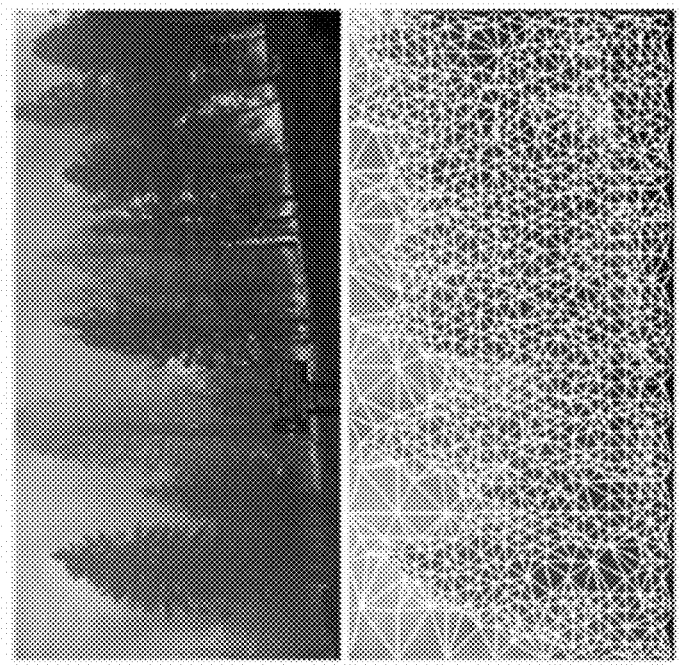
FIGS. 17A-17B illustrate exemplary DT guided segmentation for a sample forest fire detection image, for use with embodiments described herein.

FIGS. 16A-16B illustrate exemplary DT guided segmentation for a sample building crack detection image, for use with embodiments described herein. FIGS. 17A-76B illustrate exemplary DT guided segmentation for a sample forest fire detection image, for use with embodiments described herein.

The images captured and analyzed by task-specific IoT applications will have pattern (image segment outlines) bias because of the nature of the objects that are present in the images. For a building crack detection application, the images will consist of cracked and uncracked surfaces (FIGS. 16A-16B) and for a forest fire surveillance application, the images will consist of trees and occasional fires (FIGS. 17A-17B). Just like color distribution bias, common pattern bias will also exist both in the application level and in the device location level. If embodiments herein capture and store these domain-specific repeating patterns in a dictionary, for example, then embodiments herein might potentially save space by storing dictionary entry indices instead of concrete data.

Region-of-Interest (ROI) Bias

Certain objects/regions in the image may hold more importance depending on the IoT task. If the image can be compressed based on the application-specific requirement then embodiments herein save important regions at higher quality while sacrificing other regions. For example, assume an IoT application which is designed to identify all green cars in a parking lot. The image regions other than the ones with green car(s) can be subject to extra compression without hampering the application task performance. The ROIs for this scenario are the regions containing green car(s). This task specific knowledge can be learned and exploited for further compression.

To address the aforementioned requirements and limitations of conventional systems, embodiments herein enable a machine learning (ML) guided image compression framework that judiciously sacrifices visual quality to achieve much higher compression when compared to conventional techniques, while maintaining accuracy for coarse-grained vision tasks. Embodiments herein capture application-specific domain knowledge and efficiently utilize it in achieving high compression.

Example embodiments employ knowledge acquisition, encoding, and decoding. During knowledge acquisition, different application and domain-specific information such as color distribution, common pattern bias and Region-of-Interest bias can be extracted in the form of (1) a color quantization dictionary, (2) a common pattern dictionary, and (3) a machine learning model which can intelligently represent image segments as a set of common pattern dictionary entries, respectively.

During the encoding stage, an image is segmented into non-overlapping triangles using an efficient Delaunay triangulation (DT) method. A machine learning (ML) model, which may be referred to herein as a pattern prediction model, and the common pattern dictionary from the knowledge acquisition stage are used to guide the image segmentation process. Finally, the colors are assigned by averaging the pixel colors within each triangle and quantizing them based on the color quantization dictionary, which is constructed by analyzing the color distribution from the domain using k-means. The decode phase operates similarly by reconstructing the segments using DT and assigning colors from the color quantization dictionary.

Discussed herein, example embodiments of the present disclosure are configurable across a wide range of compression/quality and is capable of compressing beyond the standard quality factor limits of both JPEG 2000 and WebP. Embodiments herein enable compression of images from a given dataset. Experiments are presented herein on representative IoT applications using multiple vision datasets and show 42.65× compression at similar accuracy with respect to the source. Results herein highlight low variance in compression rate across images using embodiments described here as compared to JPEG 2000 and WebP.

Embodiments herein have been evaluated using two publicly available datasets: fire detection and building crack detection. For the building crack detection dataset, at a 1.06% accuracy loss, embodiments herein obtained 22.09× more compression with respect to the source images. For the fire detection dataset, at a 2.99% accuracy loss, embodiments herein obtained 42.65× more compression with respect to the source images. Embodiments herein enable flexibility; that is, embodiments herein enable ~167× more compression than source at a higher accuracy loss (~13%). Furthermore, variability in compressed image size and the energy requirements of embodiments are presented herein as well.

Disclosed are methods, systems and associated algorithms for a combined light-weight machine learning-based image compression and encryption technique. The joint compression (encoding/decoding) and encryption (encryption/decryption) system compresses image files and videos and optionally encrypts them. Generally, similar images from specific domains (e.g., maritime surveillance) may have shared patterns. The similar patterns may be captured in a dictionary using machine learning algorithms. An image file from a target domain is represented approximately using entries from the dictionary (also referred to herein as a repository) with the aid of the machine learning algorithm(s). In some embodiments, the dictionary used for decoding is a secret dictionary between a sender and a receiver. In such embodiments, the image file is encrypted by construct. The joint compression and encryption method tracks similar patterns across a domain of image files as opposed to patterns within the same image file. It will be appreciated that encryption of an encoded file according to embodiments of the present disclosure is optional. It will also be appreciated that, despite a lack of a specific intentional encryption operation, a data packet transmitted between a sender and a receiver according to embodiments of the present disclosure are effectively "encrypted" based upon the present encoding technique because a receiver lacking the appropriate repositories/algorithms is unable to make sense of the received data packet(s). An affirmative, and optional, encryption operation further secures the data packet(s).

In embodiments, a joint compression and encryption system comprises an initial calibration process by which a first entity and second entity perform a handshake via a secure communication channel in order to exchange necessary information for subsequent exchange of encoded and/or encrypted image file data via an unsecure communication channel.

In some embodiments, an example joint compression and encryption system involves a knowledge acquisition procedure to analyze a set of sample images from a given use-case and learn common features that can be reused during compression (discussed below). To capture application-specific domain knowledge, a color quantization dictionary is constructed as is a common pattern dictionary. A machine learning model is then trained in order to learn to represent segments of an image as a set of patterns from the common pattern dictionary.

According to embodiments, the color quantization dictionary of most frequently occurring colors is generated for a specific application. Colors are therein represented as entries in the dictionary instead of the standard 24-bit RGB value. The number of entries in the dictionary can be controlled by the user. To construct the color dictionary, the color distribution is extracted from a set of domain-specific sample images and then unsupervised machine learning (k-means) is applied to extract the colors which are strong representatives of the entire color space. The color quantization dictionary may be used during the encoding and decoding phase for representing the image. Algorithm 1 (below) provides an example of how an example color quantization dictionary may be constructed.

---

Algorithm 1

---

```
1:   procedure LEARN(bDim, iterLimit, pw, imgList, grid, th, cb)
2:      Initialize colorFreq = Ø, trainX = Ø, trainY = Ø
3:      patDict = generatePatternDict(imgList, bDim)
4:      for each img ∈ imgList do
5:         pointArr = Ø
6:         pointArr = gridSpray(pointArr, grid, img.rows, img.cols)
7:         edgePoints = cannyEdgeDetection(img)
8:         pointArr.append(edgePoints)
9:         iter = 0
10:        while iter < iterLimit do
11:           pointArr = split(pointArr, img, th)
12:           iter = iter + 1
13:        prunePoint(pointArr, pw)  ▷In every (pw X pw) window,
14:           keep maximum 1 point
15:        triangleList = delaunay_triangulation(pointArr)
16:        for each t ∈ triangleList do
17:           avg_color = findAvgColor(t, img)
18:           if avg_color in colorFreq then
19:              color Freq[avgColor] = colorFreq[avgColor] + 1
20:           else
21:              colorFreq[avgColor] = 1
22:        blockList = tiling(img, bDim)
23:        j = 0
24:        while j < length(blockList) do
25:           dictInd = assignDictInd(blockList, j, pointArr, patDict)
26:           trainX.append(blockList[j])
27:           trainY.append(dictInd)
28:           j = j + 1
29:     colorDict = weighted_kmean(colorFreq, k = $2^{cb}$)
30:     model = train_Point_Prediction_Model(trainX, trainY)
31:     return color Dict, model, patDict
```

---

In some embodiments, compressing an image file involves segmenting an image into representative triangles using Delaunay triangulation (DT). The triangle segments are determined from the points sprayed on the 2D image plane. Hence, patterns in an image segment can be represented as a set of points in a 2D plane. The forest fire images in FIGS. 17A-17B illustrate this process. In embodiments, a common pattern dictionary is a data structure comprising the regularly occurring spray point patterns that occur in an image segment. The patterns are indexed in the common pattern dictionary such that a higher index is associated with more complex details. The common pattern dictionary can be statically generated to increase compression robustness across different image domains or learned during the knowledge acquisition phase to be in more tune with the application domain.

In embodiments, a machine learning model is trained that learns to represent the segments of an image as a set of patterns from the common pattern dictionary. Embodiments herein operate on 'blocks' of an image and must partition the image. Each block is preferably assigned a point spray pattern entry from the common pattern dictionary during encoding. The assignment can be based on how much texture details the image block has or the importance of the image block for a given application. Various embodiments herein focus on detecting regions with higher information density and training the model (using the data from the automatic supervision technique described in Algorithm 1 above) to retain more details in those regions. The trained ML model (pattern prediction model) may be utilized herein for assigning an image block to an entry from the common pattern dictionary.

Iterative heuristic driven DT segmentation methods have time complexity O (IM log M), where I is the number of iterations and M is the maximum number of points used for computing DT. The present pattern prediction model can provide the points in O(1) followed by a single DT of complexity O(M log M). In embodiments, the pattern prediction model provided herein has multiple benefits: (1) the ML guided assignment of an image block to a specific pattern dictionary entry is faster than determining the segmentation pattern of the image block using iterative heuristic means; and (2) the ML model can be trained to retain more details for specific image blocks which may be important for the specific visual task.

Before communication can start between a sender entity and a receiver entity, embodiments herein preferably construct the above three components during what is referred to herein without limitation as a knowledge acquisition phase. The pattern prediction model (1) preferably resides on the sender (encoder) side. The common pattern dictionary (2) and color quantization dictionary (3) preferably reside on both sender and receiver sides.

Algorithm 1 (above) illustrates a non-limiting example of what may be referred to without limitation as a knowledge acquisition process which can be used to construct the aforementioned components. It will be appreciated that algorithms presented herein are provided as non-limiting examples.

Continuing with reference to knowledge acquisition, a set of sample images (e.g., a learning or training dataset) can be collected that can approximately represent the nature (e.g., domain, or other method of categorization) of images that are to be communicated (e.g., transmitted). For example, in line 3 of Algorithm 1, the common pattern dictionary is generated. For this example embodiment, the generation of the common pattern dictionary is such that entry indexed i has exactly i points sprayed randomly in a (bDim×bDim) block. For each image, the pointArr (e.g., set of points on the 2D image plane) is constructed which determines the segmentation. The pointArr is initially populated with grid points sprayed uniformly based on the parameter grid (e.g., line 6 of Algorithm 1, using Algorithm 3, for example, below) and edge points determined by an edge detection algorithm (e.g., line 7 of Algorithm 1). In certain embodiments, canny edge detection is employed. More points may be added to the pointArr by repeatedly splitting triangles with standard deviation of pixel intensity greater than th (e.g., lines 10-12 of Algorithm 1, using Algorithm 2, for example, below). This process is done to capture more information, but it is noted that this may in some cases result in unnecessary details and ultimately less compression. Therefore, in embodiments, at most 1 point might be kept in the pointArr for every (pw×pw) non-overlapping window (e.g., line 13 of Algorithm 1). Higher value of pw will lead to the construction of a pattern prediction model that captures more details at a cost of image size. DT is then performed to obtain the triangle list (e.g., line 15 of Algorithm 1).

---

Algorithm 2

---

```
procedure SPLIT(pointArr, img, th)
   triangleList = delaunay_triangulation(pointArr)
   for each t ∈ triangleList do
      stdDevColor = calculate Color Std_Dev(img, t)
      if stdDevColor > th then
         pointArr. append(barycenter (t))
   return pointArr
```

| Algorithm 3 |
| --- |
| 1: procedure GRIDSPRAY (pointArr, grid, rows, cols) |
| 2:     i = 0 |
| 3:     while i < rows do |
| 4:         j = 0 |
| 5:         while j < cols do |
| 6:             pointArr.append((i, j)) |
| 7:             j = j + grid |
| 8:         i = i + grid |
| 9:     return pointArr |

In embodiments, for each triangle in the triangle list, the average color is obtained and the colorFreq is updated. The colorFreq holds the frequency of each triangle color encountered across all the images (e.g., lines 16-21 of Algorithm 1). cb (e.g., a number of bits for representing colors) is a user input to control the size of the color quantization dictionary. The image is divided into blocks of dimension (bDim× bDim) and the common pattern dictionary (patDict) entry index is computed which best corresponds to the point spray pattern of each block (e.g., line 25 of Algorithm 1). The dictInd and the RGB block (blockList[j]) act as the label and input data (respectively) for training the point prediction model (e.g., lines 26-27 of Algorithm 1). The entries are clustered (e.g., weighted by their frequency) in the colorFreq using k-means algorithm. In embodiments, the number of clusters is $2^{cb}$. The cluster representatives are assigned an index and collectively form the color quantization dictionary (colorDict). In this way, unsupervised machine learning may be employed to leverage domain-specific color distribution information. The model training process may, in certain embodiments, depend on the ML model architecture selected for the domain-specific point prediction task. After what is referred to herein without limitation as the knowledge acquisition phase completes the application is ready to encode (compress) and decode images.

Algorithm 4 is provided below as a non-limiting example of an image encoding process that may be used in conjunction with embodiments herein. The image encoding process may occur at the sender side. A given image file is divided into blocks based on the dimension specified by bDim (e.g., line 2 of Algorithm 4). For each block, the pattern dictionary entry to use is predicted with the help of the point prediction model (e.g., line 5 of Algorithm 4). The label predicted by the ML model is divided by the input d, a tunable parameter that allows for dynamic image quality. Higher values of d are associated with higher compression rates. The predicted labels for each block are appended to the labelsArr (e.g., line 6 of Algorithm 4). For a label predicted for a specific block, the associated point spray pattern is fetched (e.g., or retrieved) from the common pattern dictionary (patDict) and the points are appended to the pointArr after their absolute position with respect to the image are computed (e.g., lines 8-11 of Algorithm 4). pointArr is next populated with grid points sprayed uniformly based on the parameter grid (e.g., line 13 of Algorithm 4, using Algorithm 3, for example). DT is performed to obtain the triangleList in line 14 of Algorithm 4. For each triangle in the triangleList the average color (avgColor) is computed and its closet match (quantColor) is found from the color quantization dictionary (colorDict). The quantColor is appended to the colorList. The final encoded image consists of the following converted and packed as bits:

img.rows: The number of pixel rows in the image (e.g., 16 bits).

Img.col: Number of pixel columns in the image (e.g., 16 bits).

grid: Number of pixels to skip between 2 grid points sprayed (e.g., 16 bits).

bDim: Dimension of the image block to use (e.g., 16 bits).

labelsArr: log 2(patDict size) bits for each entry.

colorDict: log 2(colorDict size) bits for each entry.

The encoded image (endImg) is returned.

| Algorithm 4 |
| --- |
| 1: procedure ENCODE(bDim, d, img, model, color Dict, patDict, grid) |
| 2:     block list = tiling(img, bDim) |
| 3:     Initialize pointArr = 0, labelsArr = 0, bIndex = 0 |
| 4:     for each block E blockList do |
| 5:         label = (predict(block, model, bDim))/d |
| 6:         labelsArr.append(label) |
| 7:         points = patDict[label] |
| 8:         for each p(r, c) E points do |
| 9:             p.c = p.c + (bIndex%bDim) * bDim |
| 10:           p.r = p.r + (bIndex/bDim) * bDim |
| 11:      pointArr. append(points) |
| 12:      bIndex = bIndex + 1 |
| 13: pointArr = gridSpray(pointArr, grid, img.rows, img.cols) |
| 14: triangleList = delauney triangulation (pointArr) |
| 15: colorList = 0 |
| 16: for each t E triangleList do |
| 17:     avgColor = findAvgColor(t, img) |
| 18:     quantColor = findClosestMatch(avgColor, color Dict) |
| 19:     color List. append (quantColor) |
| 20: encImg = cast to bits (img.rows, img. cols, grid, bDim, |
| 21:         labelsArr, colorList) |
| 22:     return encImg |

Algorithm 5 is provided below as a non-limiting example of an image decoding process that may be used in conjunction with embodiments herein. In embodiments, the image decoding process occurs at the receiver side. Based on the encoding format, rows, cols, grid, bDim, labelArr and colorList are extracted from the encoded image (encImg) in line 2 of Algorithm 5. For each label in the labelArr, the associated point spray pattern is fetched (e.g., retrieved) from the pattern dictionary and the points are appended to the pointArr after their absolute position with respect to the image are computed as well as the block index (bIndex) (e.g., lines 6-8 of Algorithm 5). The pointArr is next populated with grid points sprayed uniformly based on the parameter grid (e.g., line 11 of Algorithm 5, using Algorithm 3, for example, above). DT is performed to obtain the triangleList in line 12 of Algorithm 5. A blank image is initialized with the obtained dimensions in line 14 of Algorithm 5 of Algorithm 5. For each triangle in the triangleList, the RGB color (trueColor) is obtained from the color quantization dictionary using the corresponding entry from the colorList (e.g., line 16 of Algorithm 5). The pixels are then colored in recImg for the given triangle using trueColor (e.g., line 17 of Algorithm 5). The final decoded/recovered image (recImg) is returned.

| Algorithm 5 |
| --- |
| 1: procedure DECODE(encImg, colorDict, patDict) |
| 2:     rows, cols, grid, bDim, labelsArr, colorList=unpack(encImg) |
| 3:     Initialize bIndex = 0, pointArr = 0 |
| 4:     for each label E labelsArr do |
| 5:         points = patDict[label] |
| 6:         for each p(r, c) E points do |
| 7:             p.c = p.c + (bIndex%bDim) * bDim |
| 8:             p.r = p.r + (bIndex/bDim) * bDim |
| 9:         pointArr.append(points) |

Algorithm 5

```
10:     bIndex = bIndex + 1
11:     pointArr = gridSpray(pointArr, grid, rows, cols)
12:     triangleList = delaunay triangulation(pointArr)
13:     i = 0
14:     recImg = Array of Zeros of Dimension(rows, cols)
15:     while i < size(triangleList) do
16:        trueColor = color Dict[colorList[i]]
17:        drawTriangle (triangleList[i], trueColor, recImg)
18:     return recImg
```

Exemplary Joint Compression and Encryption Operations

Figure 1B:
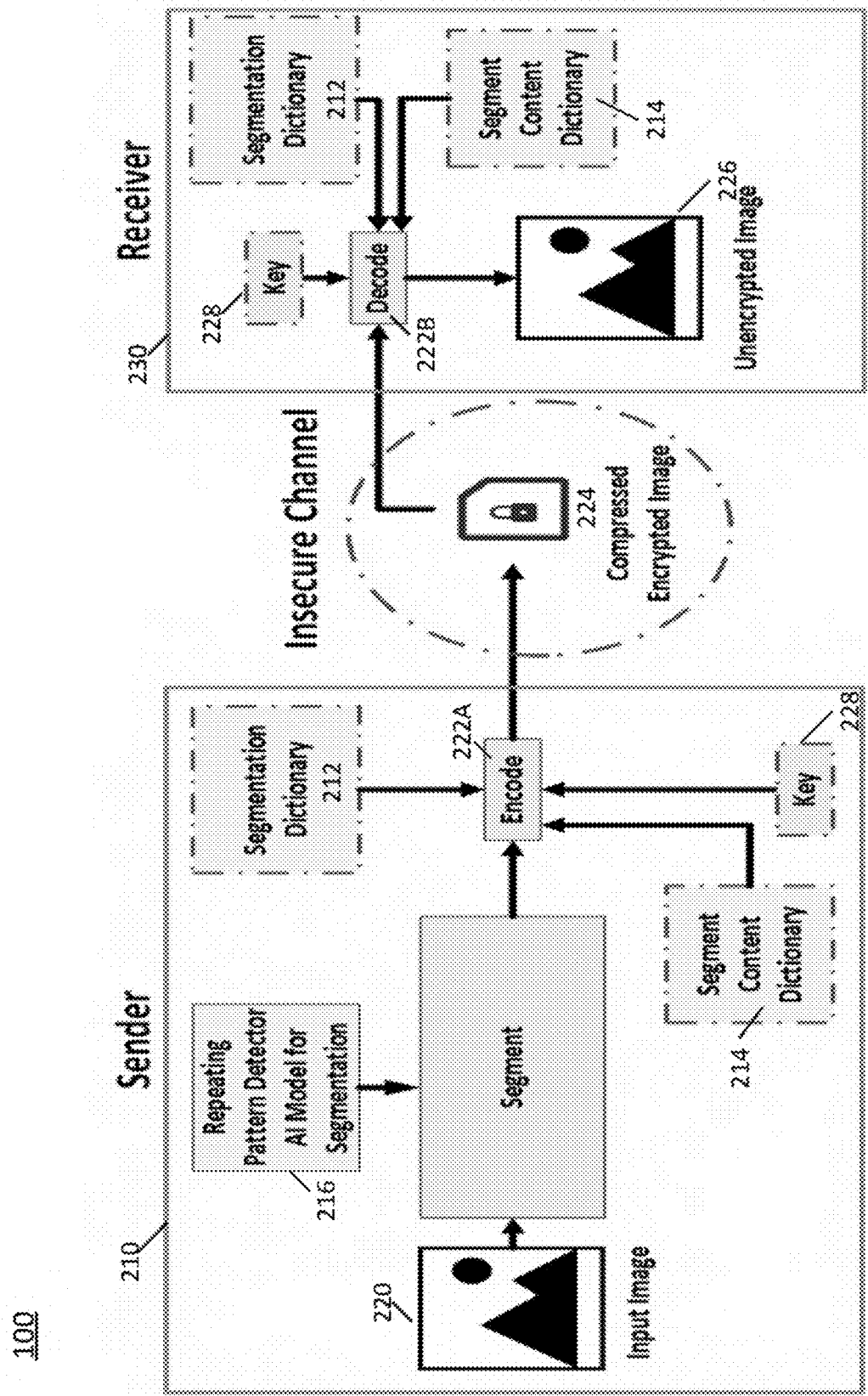

FIGS. 1A and 1B illustrate an exemplary joint compression and encryption system, in accordance with some embodiments. In some embodiments, the joint compression and encryption system 100 comprises a first computing entity 210 and a second computing entity 230. The first computing entity 210 (e.g., a sender), and the second computing entity 230 (e.g., a receiver), are in communication with each other. In some embodiments, the first computing entity 210 and the second computing entity 230 communicate over an unsecured communication channel. In some embodiments, the first computing entity 210 comprises a segmentation repository 212, a color quantization dictionary 214, machine learning algorithm(s) 216, and optionally an encryption/decryption key 228. In some embodiments, and as a result of the aforementioned and below described handshaking/calibration process, the second computing entity 230 comprises the machine learning algorithm(s) (not shown), the segmentation repository 212, and the color quantization dictionary 214. In some embodiments, the second computing entity 230 further comprises the encryption/decryption key 228 as a result of exemplary operations referred to herein in a non-limiting manner as a handshaking/calibration process.

In some embodiments, first computing entity 210 retrieves or obtains an image file 220 (it will be appreciated that, for example, the first computing entity may be a drone or otherwise autonomous computing entity with image capturing capabilities as well as local storage capabilities). The input image file 220 comprises a first plurality of segments. In some embodiments, the first computing entity 210 identifies, for one or more segment of the first plurality of segments, a matching segment in the segmentation repository 212 to generate a matching segment set. In some embodiments, the first computing entity 210 encodes 222A the input image file 220, using the segmentation repository 212, the color quantization dictionary 214, the trained machine learning algorithm 216. Optionally, in some embodiments, the first computing entity 210 encrypts the encoded image file using a key 228. In some embodiments, the segmentation repository 212 comprises the machine learning algorithm. In embodiments, the machine learning algorithm is trained based on the set of images comprising images of similar nature to a subject of the input image file 220.

In some embodiments, the first computing entity 210, identifies, for one or more segment of the first plurality of segments of the input image file 220, a matching segment in the segmentation repository or dictionary 212. The first computing entity 210 further compresses remaining segments of the first plurality of segments of the input image file 220 for which no matching segment was identified into a compressed remaining set. In some embodiments, the first computing entity 210 transmits to the second computing entity 230 the compressed remaining segment set 224 (e.g., because the second computing entity has already received the segmentation repository 212, color quantization dictionary 214, and optionally encryption/decryption key 228 during the handshake/calibration process). In some embodiments, the encoded and encrypted image file 224 is transmitted to the second computing entity 230 over an unsecured communication channel. In some embodiments, the compression and/or encryption is performed in one of a time, a frequency, or a joint time-frequency domain.

Subsequently, the second computing entity 230 uses the segmentation repository 212, the color quantization dictionary 214, the machine learning model(s) (not shown), the encoded segments (e.g., from 222A), and the compressed remaining segments 224 to recover (e.g., decode 222B and/or decrypt) the input image file 220 (e.g., into resulting image file 226). In some embodiments, the second computing entity 230 decodes (e.g., 222B) the encoded segments (e.g., from 222A) using the segmentation repository 212 and the color quantization dictionary 214, and retrieves the input image file 220 (e.g., retrieves into/as image file 226) based on the decoded segments and the remaining segments 224. In embodiments, in the event the data received from the first computing entity 210 is encrypted using the encryption/decryption key 228, the second computing entity 230 decrypts the encrypted segments using the encryption/decryption key 228.

It will be appreciated that, in various embodiments, the machine learning model(s), the segmentation repository, the color quantization dictionary, and the key may be required to both encode and decode the image files (e.g., images or videos). Accordingly, the machine learning model(s), segmentation repository, color quantization dictionary, and the key may be required to reside on (e.g., or be possessed by) both the sender (e.g., the first computing entity) and the receiver (e.g., the second computing entity). Further, encryption can be carried out by keeping secret one or more of the machine learning model(s), segmentation repository, color quantization dictionary, or the key.

In some embodiments, where a segmentation of the input image file 220 is not available, a closest segment is selected. For example, upon determining that for at least one segment of the input image file 220 there is not a matching segment in the segmentation repository 212, the first computing entity 210 identifies a substantially matching segment in the segmentation repository 212. For example, in some embodiments, the identified substantially matching segment may have a color substantially matching a color of the at least one segment of the input image file 220. In some embodiments, the identified substantially matching segment may have a hue that substantially matches a hue of the at least one segment of the input image file 220. In some embodiments, the identified substantially matching segment may have a pattern substantially matching a pattern of the at least one segment of the input image file 220. Alternatively, in some embodiments, the identified substantially matching segment may have a texture substantially matching a texture of the at least one segment of the input image file 220.

In some embodiments, to represent an identified segment of the input image file 220, the first computing entity 210 encodes 222A the identified segments using the segmentation repository 212 and the color quantization dictionary 214. In some embodiments, the bulk of compression of the decoding 222A is performed by transmitting those identified segments that match the segments of the input image file 220, instead of a general representation of each segment of the input image file 220. In some embodiments, the overhead of a one-time transmission of the segmentation repository 212 and the color quantization dictionary 214 (e.g., so that segments can be retrieved by the receiving device 230) is less than transmitting all uncompressed segments of the input image file 220 to the receiving device 230.

In some embodiments, during the compression process, each identified segment and its respective identification are permuted (e.g., encrypted). The permuted segments and the identifications are subsequently substituted using the key 228. The substitution with the key 228 makes recovery of the input image file 220 by the second computing entity 230 impractical without the key 228. In some embodiments, the second computing entity 230 performs decryption (using the key 228) to obtain the image file 220 (e.g., to recover as image 226). As an example, the second computing entity 230 uses a reverse-substitution-permutation operation (e.g., as a non-limiting example of decryption) to obtain the image file 220 (e.g., to recover as image 226).

In some embodiments, the machine learning algorithm 216 determines one or more textural content objects in a training set of input image files 220 and stores the textural content objects of a textural content segment in the segmentation repository 212. The textural content segments within the segmentation repository 212 can be transmitted to the second computing entity 230 so that the second computing entity 230 may use the segmentation repository 212 to recover the input image file 220 (e.g., at image file 226). In some embodiments, prior to transmitting a first plurality of segments to the second computing entity 230, the first computing entity 210 encode 222A any matching segment using the key 228 into an encoded segment set.

In some embodiments, the machine learning algorithm 216 also determines the remaining segments of the first plurality of segments for compression, where the machine learning algorithm maintains or assists in maintaining a low-quality representation of the information deemed unnecessary for an analysis performed by embodiments described herein. Alternatively, in some embodiments, the machine learning algorithm determines the remaining segments of the first plurality of segments for compression, where the machine learning algorithm only keeps segments with information required for an analysis performed by embodiments described herein.

In some embodiments, the machine learning algorithm is used for one or more of identifying the matching segment in the segmentation repository, predicting a point spray pattern, identifying a substantially matching segment in the segmentation repository, or detecting one or more regions of interest on the image file. In some embodiments, the second computing entity 230 performs an image enhancement after recovery of the input image file 220 (e.g., as image file 226). In embodiments, the image enhancement is performed based on one or more machine learning algorithm(s) 216.

Handshaking/Calibration

Figure 2:
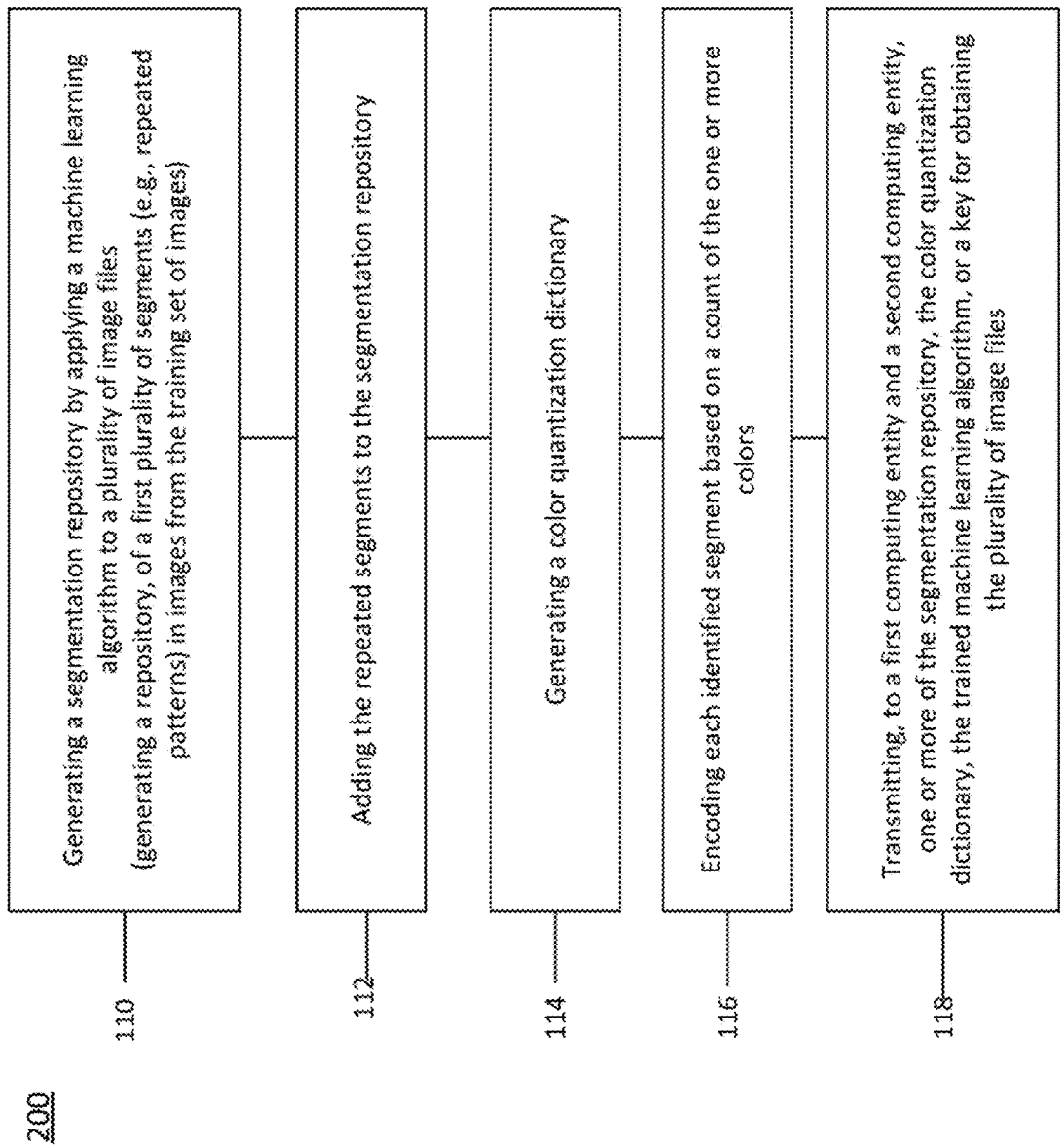
FIG. 2 illustrates an exemplary calibration process for use with embodiments of the present disclosure.

FIG. 2 illustrates a handshaking/calibration process 200 which is used by a joint compression and encryption system, in accordance with some embodiments. In some embodiments, the calibration process 100 comprises generating a segmentation repository 110 by applying a machine learning algorithm to a plurality of image files. In some embodiments, generating the segmentation repository 110 comprises generating a dictionary/repository, or a look-up-table, of a second plurality of segments, e.g., repeated patterns, in images from the training set of images. The generating the segmentation repository 110 can be performed by using an unsupervised pattern clustering or any other suitable training method. In some embodiments, training the machine learning algorithm comprises providing a training set of images to the machine learning algorithm. In some embodiments, the training set of images comprises images of similar nature to a subject of an image file (the image file 220 in FIG. 2). As a non-limiting example, in some embodiments, the machine learning algorithm is trained with known images of the ocean.

In some embodiments, the segmentation repository comprises all possible segmentation constructions or pattern information that can be used to compress the image file. In some embodiments, the machine learning algorithm is trained to identify repeated segments in the plurality of image files. In some embodiments, the process 200 comprises adding the repeated segments to the segmentation repository 112. The segmentation repository may comprise a second plurality of segments. In some embodiments, the method 200 comprises generating a color quantization dictionary 114 by the machine learning algorithm. The machine learning algorithm may generate the color quantization dictionary based at least in part on one or more colors of the second plurality of segments. In some embodiments, the color quantization dictionary comprises a plurality of identifications associated with the second plurality of segments. In some embodiments, generating the color quantization dictionary 130 comprises quantizing and storing auxiliary content within the image file, e.g., a color, a hue, a saturation, etc. to reduce an overhead of sending the information within each segment in a concrete fashion. The generating the color quantization dictionary 114 can be performed by an unsupervised pattern clustering or any other suitable method. In some embodiments, the method 100 further comprises encoding each identified segment based on a count of the one or more colors 116.

In some embodiments, the method 200 comprises transmitting 118, via a secure communication channel and to a second computing entity, the segmentation repository, the color quantization dictionary, and optionally a key. In some embodiments, the trained machine learning algorithm, the segmentation repository, and the color quantization dictionary are stored locally at a first computing entity, e.g., a sender. In some embodiments, a key is transmitted from the first computing entity to the second computing entity for use in encrypting/decrypting the image file. Subsequently, the first computing entity compresses the image file by using the color quantization dictionary and the segmentation repository (and optionally encrypts the compressed file using the encryption/decryption key). In some embodiments, the second computing entity receives, from the first computing entity, the image file over an unsecured communication channel. Therefore, the second computing entity has access to a local copy of the same color quantization dictionary and the segmentation repository. By using the segmentation repository and the color quantization dictionary (and optionally the encryption/decryption key), the second computing entity extracts the image file.

Exemplary Encryption

Figure 3:
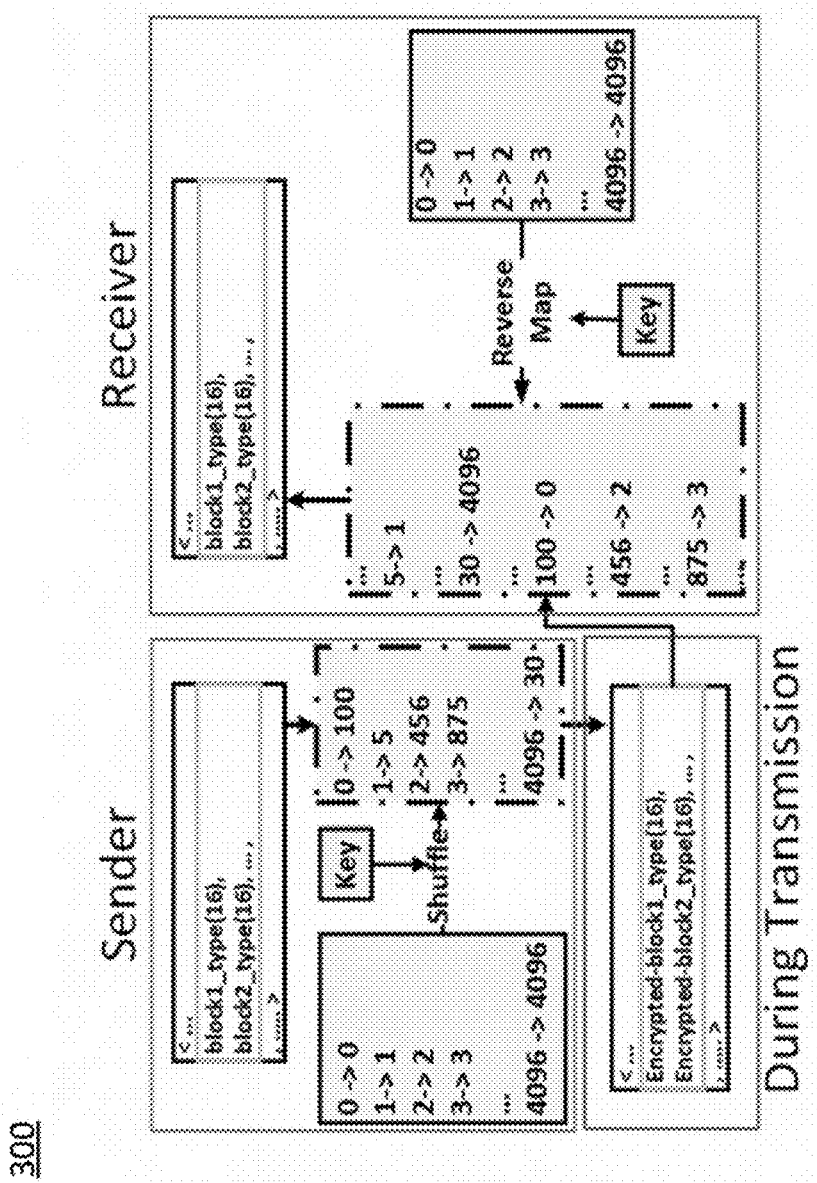
FIG. 3 illustrates an exemplary encryption operation, in accordance with some embodiments.

FIG. 3 illustrates an exemplary encryption method 300 for use with embodiments of the present disclosure. In some embodiments, the segmentation repository, the color quantization dictionary and the content repository are secret, thus, an attacker, without access to the repositories, is compelled to brute force a point spray for each block. In some embodiments, block types convey information for a part of the segmentation process. A block type can take a value from 0 to N. Where N is the number of entries in the segmentation repository. To enforce security, both the key and the segmentation repository are kept a secret. The key permutes the segmentation repository and the permuted segmentation repository is used to substitute the block type values. The reverse of these steps is carried out in the second computing entity. The block is I×J pixels, and each pixel is treated as either in the spray pattern or not, then there is $n*2^{I \times J}$ possibilities, where n is the number of blocks in an image file. If the content repository is used, the brute force complexity becomes $n*(2^{I \times J}+\varphi)$, where $\varphi$ is the amount of possible auxiliary content referred to by the content repository. If an attacker who either has access to the machine learning algorithm or can replicate the machine learning algorithm by training a similar machine learning algorithm, then the attacker should search for a correct coordinate pattern in a smaller possible solution space. In some embodiments, plaintext is the original image file and ciphertext is the encoded image file. The attacker must use known plaintext/ciphertext combinations with their own machine learning algorithm and an arbitrarily large segmentation repository to get some idea of how spray point distribution is associated with block texture. In some embodiments, to enhance security, a segmentation method which is dependent on the spray pattern of surrounding blocks is used. Because the look-up-table is a subset of the entire table, a permutation operation of the entire table is used, followed by substitution on the lookup-table content directed by an additional key input for added security.

Triangulation Process

It will be appreciated that various methods of performing triangulation may be employed with embodiments of the present disclosure without departing from the scope herein. In some embodiments, segmentation is achieved by triangulation.

In some embodiments, a texture aware point spray followed by Delaunay triangulation approach is used to divide the image file into triangular segments. Delaunay triangulation works in two stages: first, points are placed on the 2D image and, then, the points are connected to each other to form non-overlapping and non-intersecting triangles. Image files across a similar set of images have certain repeating textures which require a specific point spray pattern to capture. These common point spray patterns are stored in a dictionary and the machine learning algorithm, which is trained for point spray predicting, selects a pattern best suited for each image sub-block from the segmentation repository.

Figure 4:
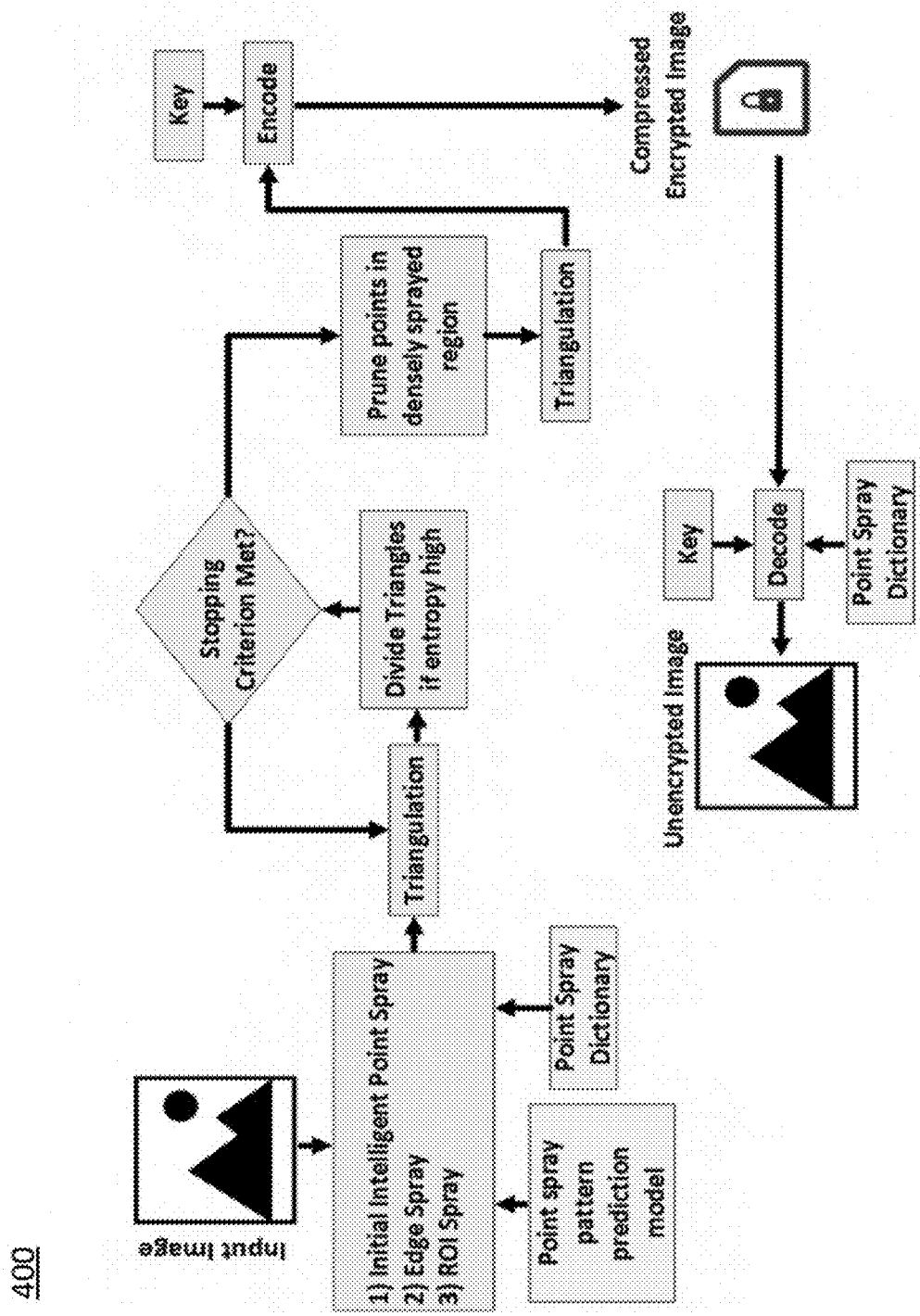
FIG. 4 illustrates exemplary compression and encryption operations, in accordance with some embodiments.
Figure 6A:
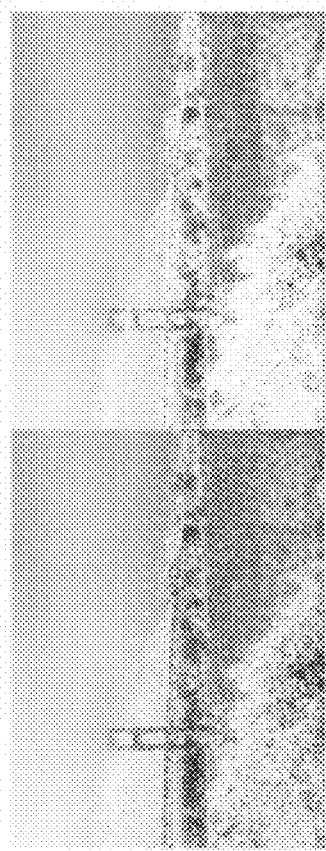
FIGS. 6A, 6B, 6C, 6D illustrate exemplary successive triangulations and recovering of an image file, in accordance with some embodiments.
Figure 6B:
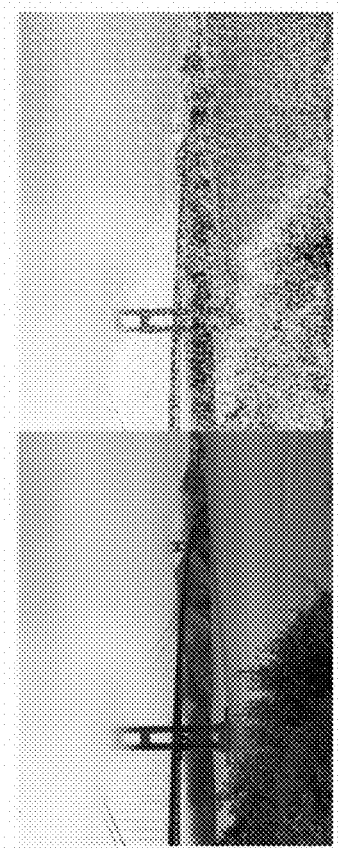
Figure 6C:
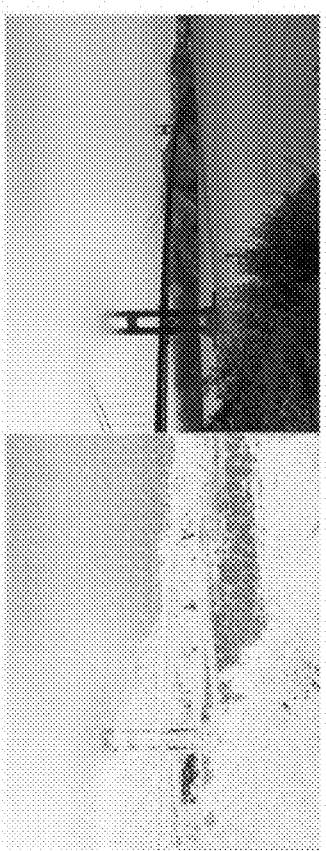
Figure 6D:
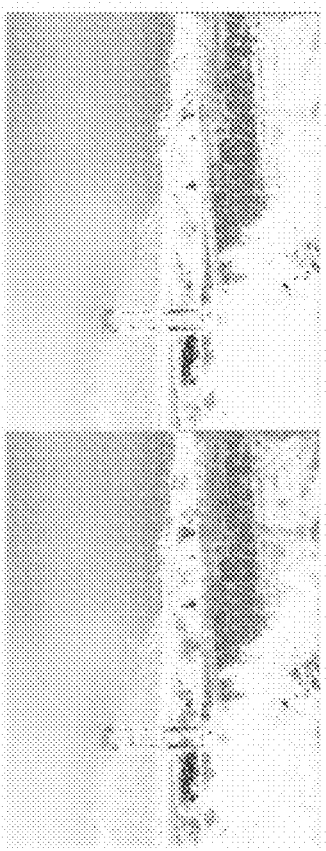

FIG. 4 illustrates example compression/encryption steps 400, in accordance with some embodiments. In some embodiments, for each sub-block in the image file, a particular spray pattern is predicted by the machine learning algorithm and these points are represented in the encoding using the pattern's segmentation identification. In some embodiments, an edge detection is performed, and a point is assigned to each edge to preserve structure.

In some embodiments, the first part of the encoding step comprises a header information followed by point spray pattern information and triangle color information. The image file cannot be decoded without accessing the segmentation repository, which adds to the security of the encoding step. FIG. 5 illustrates the encoding format, in accordance with some embodiments. In some embodiments, the first computing entity performs a region of interest (ROI) detection on the image file and puts more points on those regions. For example, during compressing surveillance image files, the first computing entity performs face detection and preserves high quality for the faces in the image file. Alternatively, the first computing entity can perform detecting one or more objects, and detecting one or more edges.

In some embodiments, upon placing initial points on the image file, the first computing entity performs the triangulation method to obtain triangles. The first computing entity further iteratively divides triangles which comprises a variation in texture by placing a point in a barycenter. In some embodiments, the first computing entity performs a pruning step to eliminate unnecessary closely placed points. The first computing entity encodes the image file by specifying the points' locations and triangle colors for all the triangles that are generated by using triangulation for those points. In some embodiments, the segmentation repository is used as the secret to achieve encryption. A separate key input can be used to substitute the value of the segment's identification in the encoding to achieve stronger security. The encrypted image file is transmitted to the second computing entity over an insecure communication channel. The second computing entity decodes the image file by using the key and the segmentation repository. FIGS. 6A-6D illustrate successive triangulations from the initial pattern to the recovery of the image file, in accordance with some embodiments. In some embodiments, the encoding/segmentation comprises a rectangulation technique or any other suitable technique.

Color Quantization

In some embodiments, image files for a particular application have a color and/or texture bias. For example, in maritime surveillance images, the blue shades are predominant, while in forest fire detection dataset, the green and yellow shades are predominant. Using the encoding step, the first computing entity transmits 24 bits of data for each RGB triangle color. In some embodiments, the first computing entity limits the color spectrum to x colors, such that $\log 2(x)<24$. For example, if x is 256, the first computing entity needs 8 bits to represent all colors and if x is 1024, the first computing entity needs 10 bits to represent all the colors. To that end, the first computing entity creates a custom color dictionary with x entries by observing the training image set during the training step. In some embodiments, a user can define the x. Alternatively in some embodiments, x is determined based on statistical observation of the training set of image files. In some embodiments, the first computing entity generates a color repository based at least in part on one or more colors of the second segments and encodes each identified segment based on a count of the one or more colors.

Hard and Soft Edge Triangle Smoothing

Figure 7:
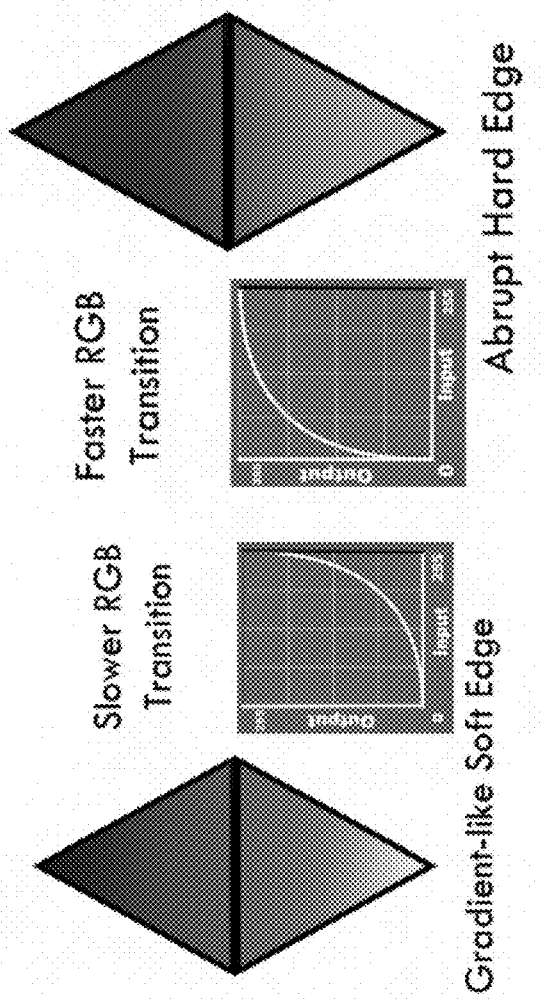
FIG. 7 illustrates exemplary hard and soft edges in context of triangulation, in accordance with some embodiments.
Figure 8:
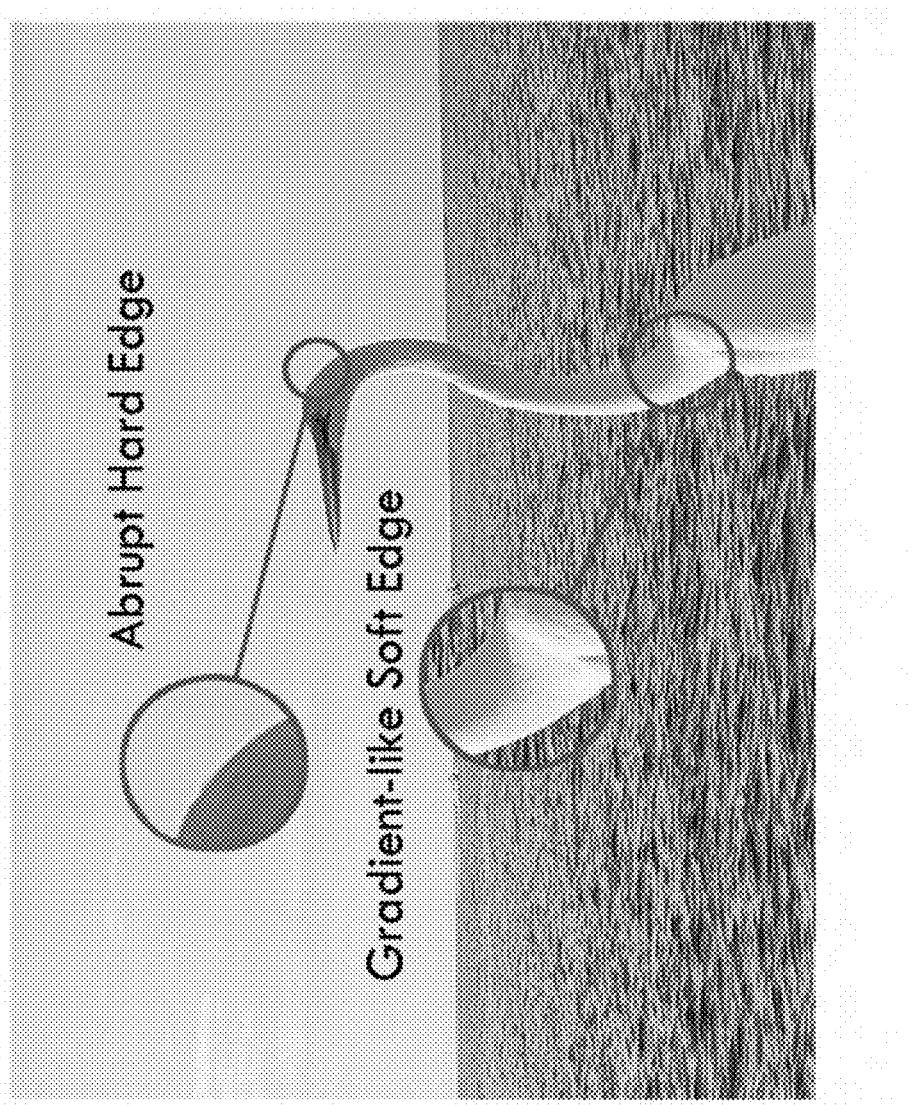
FIG. 8 illustrates exemplary hard and soft edges in a real image, in accordance with some embodiments.

FIG. 7 illustrates a hard and soft edge in context of triangulation, in accordance with some embodiments. In some embodiments, a hard or soft edge is determined by a rate at which the intensity or color values of the pixels over a distance are changing. In a 24-bit RGB system, a hardest edge would be a black pixel (0) next to a white pixel (255). Slower transitions are in turn called soft edges. An example would be a slow transitioning gradient from white to black across several pixels. Using information from each triangle's adjacent triangle, the surrounding colors linked to each of three sides are used to smoothen the triangles into hard and soft edges. By taking the color of the base triangle, and mixing it with each side's adjacent color, intermediate colors are created. From the center of the base triangle outwards towards an edge, a smooth gradient is calculated, gradually transitioning from the color of the base triangle until it reaches the triangle's edge, where the color is 50% of the base color, and 50% of the adjacent triangle's color. Each pixel's color depends on the distance and influence from each edge. Depending on the intensity difference between each triangle's color, the rate of transition can be increased or decreased, creating a hard or soft edge through the gradient. Hardness or softness can be determined by calculating the color/intensity difference between two adjacent triangles. From there, the blending occurs through adjusting the rate at which the base color's triangle color transitions to the edge color, creating hard and soft edges. The recreation of these hard and soft edges approximates qualities that are lost during the compression phase and removes some of the triangle artifacts, giving the photo a more pleasing look. FIG. 8 illustrates the hard and soft edges in a real image, in accordance with some embodiments.

Extension to Video Compression and Encryption

Figure 9:
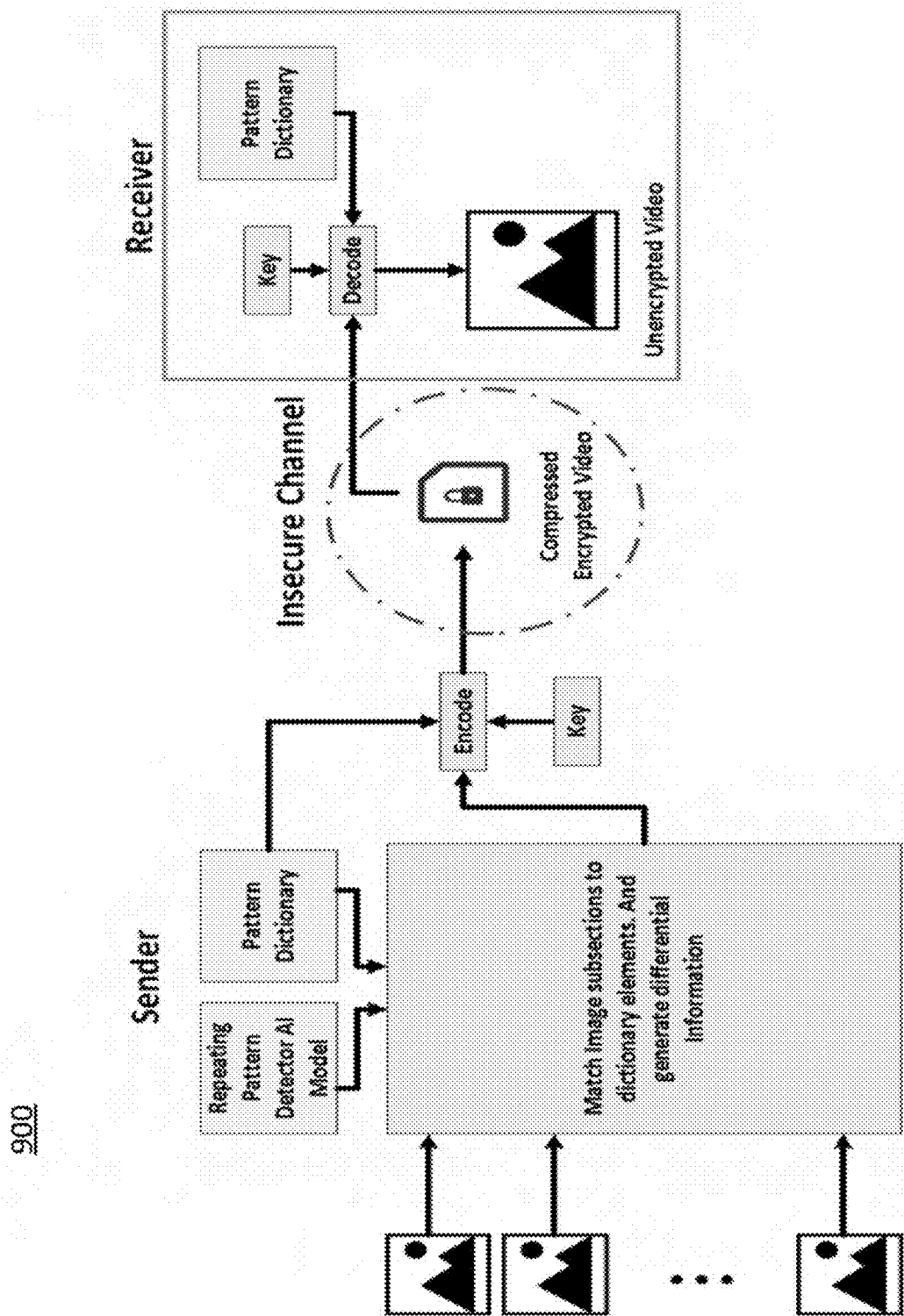
FIG. 9 illustrates exemplary encoding of a video file, in accordance with some embodiments.

FIG. 9 illustrates an overview of encoding a video file 900, in accordance with some embodiments. In some embodiments, the compression and encryption system compresses and encrypts a video file. A video is a collection of images and the first computing entity compresses each image with the differential information of preceding frames. For example, if a pattern is transmitted in the previous frame then the first computing entity can reuse the information, which eliminates the need to transfer the same information for the next frame. In some embodiments, the differential information for storing a new frame is the new points added compared to the previous frame and the old points that are not present in the new frame. The triangle color information is added for the new triangles originating from the addition of new points. The triangle color information for the triangles which no longer form due to removal of some points are further removed.

Figure 10:
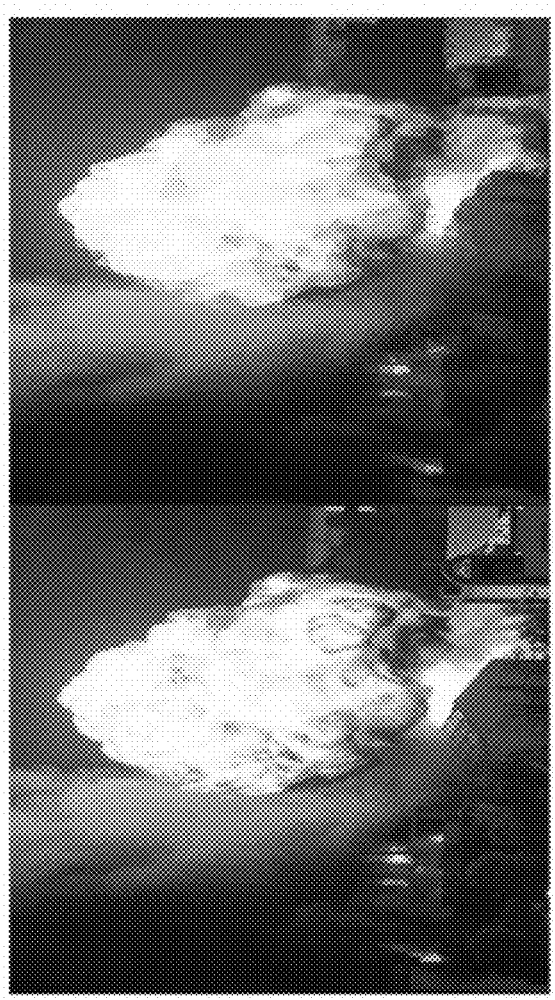
FIG. 10 illustrates exemplary effectiveness of an exemplary joint compression and encryption system in an exemplary forest fire/city fire detection system, in accordance with some embodiments.
Figure 11:
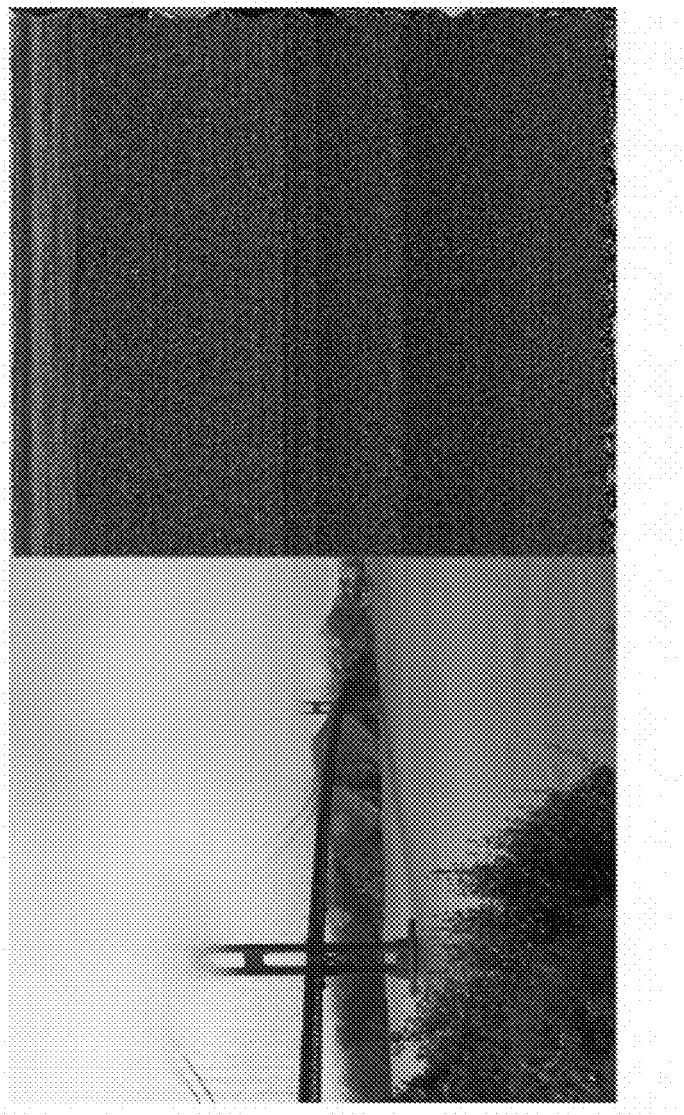
FIG. 11 illustrates exemplary effectiveness of an exemplary joint compression and encryption system, in accordance with some embodiments.
Figure 13A:
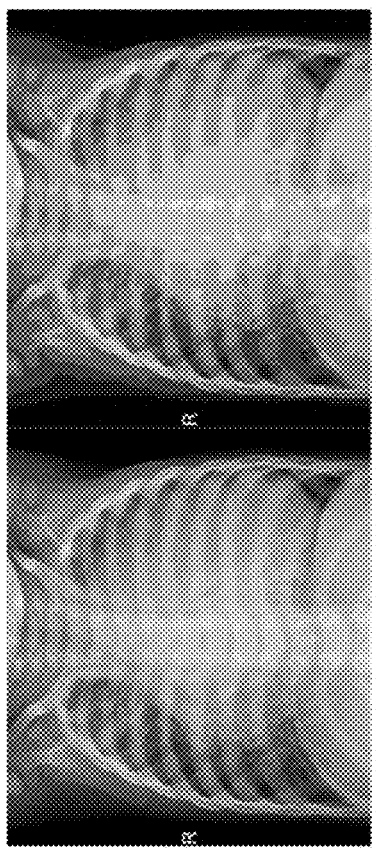
FIGS. 13A, 13B, 13C, 13D illustrate exemplary visual images of a Pneumonia X-ray, in accordance with some embodiments.
Figure 13B:
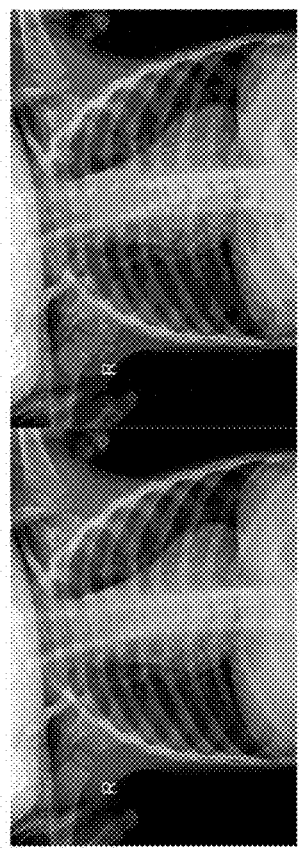
Figure 13C:
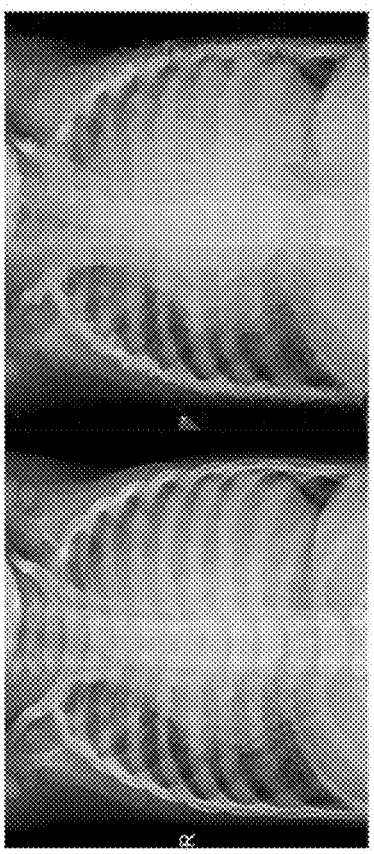
Figure 13D:
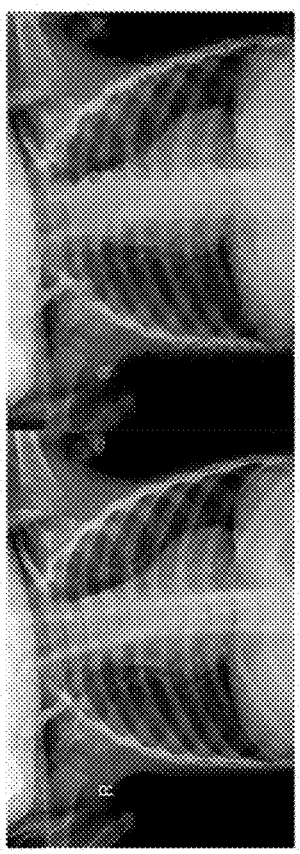

FIGS. 10 and 11 illustrate effectiveness of the joint compression and encryption system in general propose systems transmitting media content, in accordance with some embodiments. FIG. 10 shows the effectiveness of the joint compression and encryption system in forest fire/city fire detection system, in accordance with some embodiments. Fire detection is one, non-limiting application of surveillance. Other examples of surveillance can also benefit from the joint compression and encryption system such as, but not limited to maritime surveillance. For maritime surveillance, most of the image texture comprises blue/green ripples and can be easily captured in the pattern dictionary. In some embodiments, the joint compression and encryption system is used for face detection to preserve high quality face features while compressing the rest of image more aggressively. FIG. 11 illustrates that no similarity between the actual image and the recovered image with the wrong key can be seen.

Infrastructure surveillance drones inspecting building surfaces for cracks and damages operate in constrained computing environments. Such applications can potentially use the joint compression and encryption system for attaining a high compression rate and security which translates to better battery life. The joint compression and encryption system is applied on a building surface crack detection dataset. FIGS. 12A-12D illustrate visual images of a surface with and without no cracks, in accordance with some embodiments. The visual quality between JPEG 1 (highest possible JPEG compression), original source image and our method is shown. The image files compressed with the joint compression and encryption system give equally good classification accuracy as compared to different JPEG quality images. Table 1 shows that only 0.49% classification accuracy is lost, while achieving 2.04× compression over JPEG 1 (highest possible JPEG compression).

FIGS. 13A-13D illustrate visual images of a Pneumonia X-ray, in accordance with some embodiments. Telemedicine systems used for remote automatic diagnosis using medical images is another application that can potentially benefit from the joint compression and encryption system. Securing images is necessary and compression is especially important for telemedicine in remote areas which lack the infrastructure to send the uncompressed images. To showcase the benefits, the joint compression and encryption system is applied on an X-Ray based Pneumonia detection dataset. The images compressed with the joint compression and encryption system give equally good classification accuracy as compared to different JPEG quality images. Table 2 shows attaining 2.08% more classification accuracy with 1.55× more compression over JPEG 1 (Highest Possible JPEG Compression). Further, attaining 1.92% more classification accuracy with 33.65× more compression over the source image is shown.

In some embodiments, the image files are analyzed by using the machine learning algorithm and Artificial Intelligent (AI) units. In such embodiments, higher compression rates than traditional compression are achieved by sacrificing visual quality. In some embodiments, with visual quality degradation, a robustness of the analysis by the machine learning algorithm in the AI unit is similar when compared to other techniques. For example, in some embodiments, field unit(s) gather the image file data and compress and/or encrypt the image file using the compression and encryption method. In some embodiments, the field unit(s) transmit the compressed and/or encrypted image file over a low bandwidth unsecure communication channel to a cloud server. In such embodiments, power requirement is low because the image file is small. In some embodiments where the cloud server is used, the quality of the image file is further enhanced by using hard and soft edge techniques. In some embodiments, the enhanced image file is stored in a database associated. In some embodiments, one or decisions made by the AI units are stored in the database.

Figure 14:
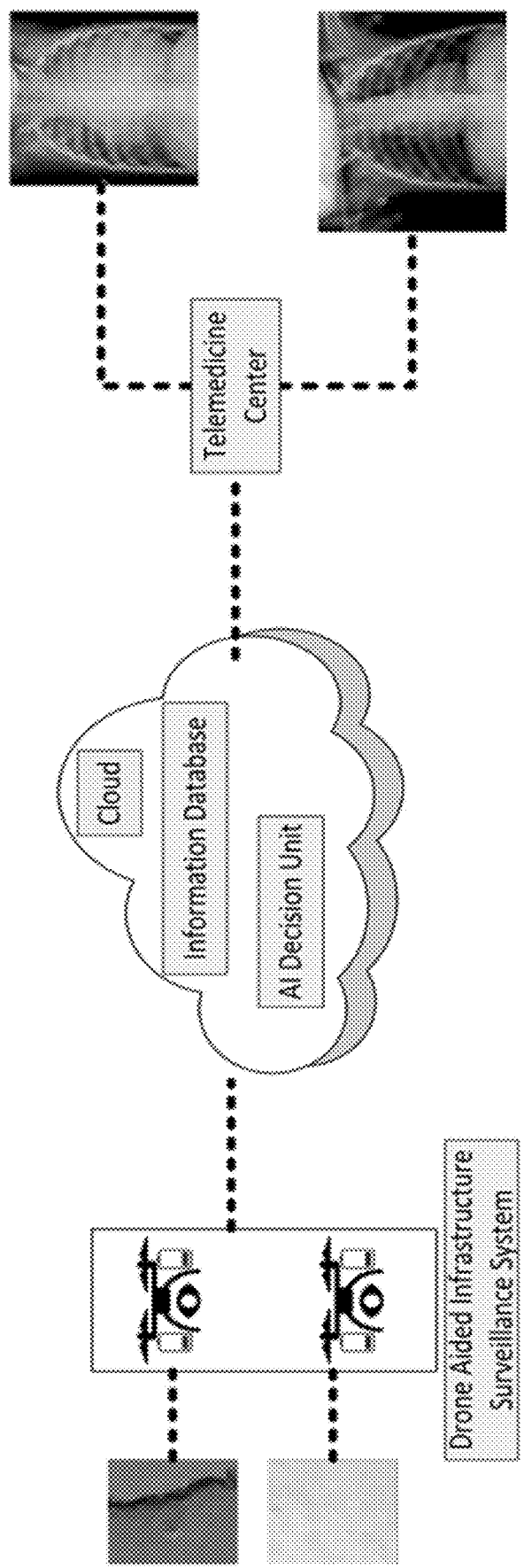
FIG. 14 illustrates application of an exemplary joint compression and encryption system, in accordance with some embodiments.

FIG. 14 illustrates application of the compression and encryption system, in accordance with some embodiments. A drone-aided infrastructure surveillance system shows the field units, e.g., the drones, capture the images of surfaces and compress and encrypt the images. The compressed and encrypted images are transmitted to the cloud server and the cloud server runs AI units to determine whether the surface in the image has any crack. A telemedicine system shows diagnostic devices collect medical image data in remote villages/towns. The diagnostic images are compressed and encrypted. The compressed and encrypted images are transmitted to the cloud for analysis by AI units.

TABLE 1

| | Avg PSNR | Classification Accuracy | AVG Bit/Pixel |
|---|---|---|---|
| Ice-Tea Down3 | 33.9545 | 0.9843 | 0.0528 |
| JPEG 1 | 28.282 | 0.9892 | 0.10805 |
| JPEG 2 | 28.282 | 0.9891 | 0.10805 |
| JPEG 3 | 28.2855 | 0.9916 | 0.1108 |
| JPEG 4 | 28.3615 | 0.9944 | 0.11735 |
| JPEG 5 | 28.4895 | 0.995 | 0.12505 |
| JPEG 6 | 28.596 | 0.9954 | 0.13385 |
| JPEG 7 | 28.733 | 0.9951 | 0.1423 |
| JPEG 8 | 28.8255 | 0.9963 | 0.15295 |
| JPEG 9 | 29.2275 | 0.996 | 0.1637 |
| JPEG 10 | 29.5775 | 0.9964 | 0.1763 |
| Source Image | 100 | 0.9948 | 0.9526 |

TABLE 2

| | Avg PSNR | Classification Accuracy | AVG Bit/Pixel |
|---|---|---|---|
| Ice-Tea Down3 | 36.51 | 85.73 | 0.029 |
| JPEG 1 | 34.55 | 83.65 | 0.045 |
| JPEG 2 | 34.55 | 83.65 | 0.045 |
| JPEG 3 | 34.56 | 82.53 | 0.046 |
| JPEG 4 | 35.39 | 82.37 | 0.049 |
| JPEG 5 | 36.19 | 83.01 | 0.053 |
| JPEG 6 | 37.35 | 81.89 | 0.058 |
| JPEG 7 | 38.05 | 82.21 | 0.063 |
| JPEG 8 | 38.58 | 82.53 | 0.068 |
| JPEG 9 | 39.15 | 82.21 | 0.073 |
| JPEG 10 | 39.59 | 83.49 | 0.079 |
| Source Image | 100 | 83.81 | 0.976 |

Additional Experimental Results

Compression as described herein may excel in autonomous task-specific IoT applications where the analysis of the images is done by machine learning models. To quantitatively analyze the effectiveness of embodiments herein for IoT applications two use-cases may be examined: forest fire surveillance, and infrastructure analysis.

Below, the experimental setup and comparison are presented of the accuracy of MAGIC compressed images to JPEG 2000 and WebP under different quality factor (QF) settings. Quality Factor (QF) is a tunable parameter which controls the level of compression. ImageMagick's convert command was used for JPEG 2000 and WebP compressions which has quality factor from 1 to 100, with 1 resulting in the highest compression. The effects that input parameters pw (prune window size used in Algorithm 1), d (degradation parameter used to reduce the numbers of sprayed points used in Algorithm 4), and cb (number of bits required to represent each color quantization dictionary entry used in Algorithm 1) have on the rate of compression and accuracy are explored. Finally, a computation, transmission energy cutoff for analyzing the energy efficiency of embodiments herein are presented.

Figure 18A:
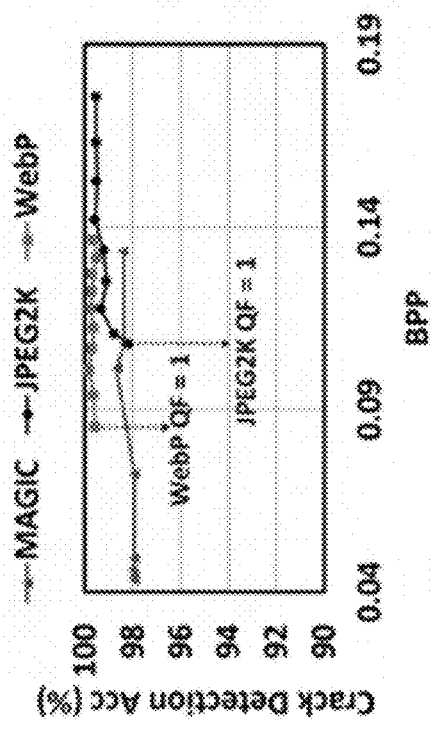
FIGS. 18A-18B illustrate a comparison of fire detection accuracy (Acc) vs bits-per-pixel BPP of JPEG 2000, WebP, and embodiments herein.
Figure 18B:
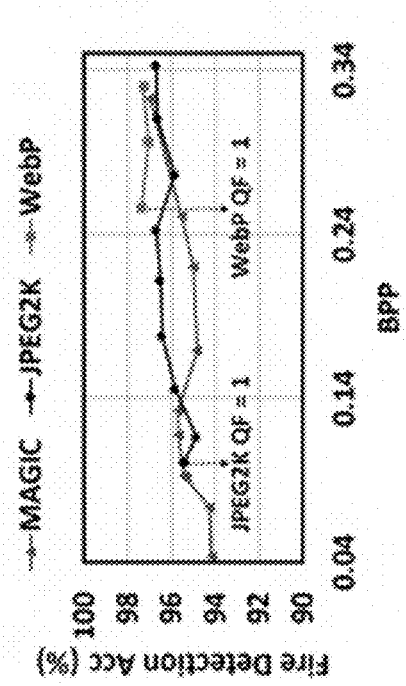
Figures 19A, 19B:
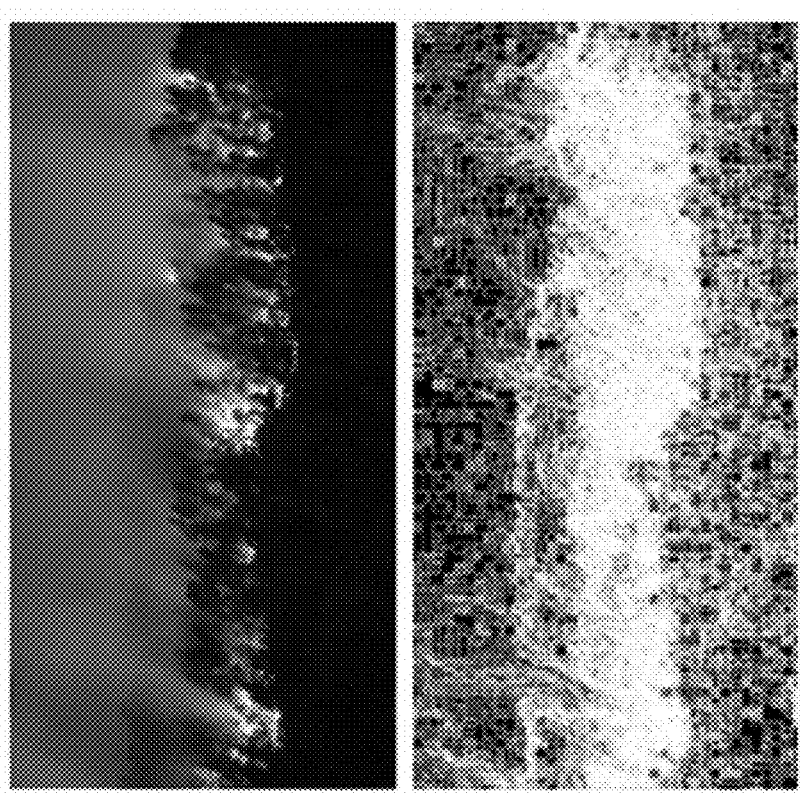
FIGS. 19A-19B illustrate an entropy feature of a sample forest fire dataset image visualized by scaling the values between 0 and 255.

FIGS. 18A-B illustrate a comparison of fire detection accuracy (Acc) vs bits-per-pixel BPP of JPEG 2000, WebP, and embodiments herein. FIGS. 19A-B illustrate an entropy feature of a sample forest fire dataset image visualized by scaling the values between 0 and 255. Brighter pixels have higher entropy.

Experimental Setup

Figure 21:
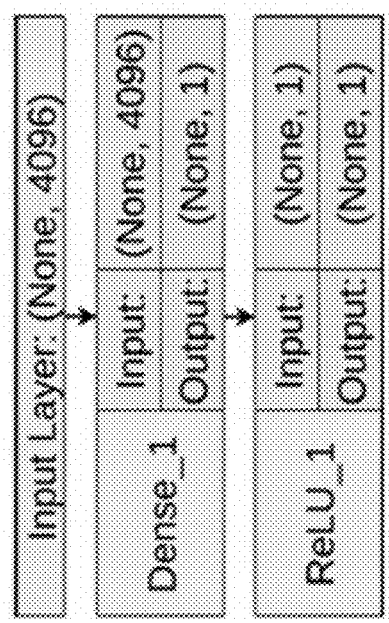
FIG. 21 illustrates an exemplary neural network architecture for domain-specific ML models for use with embodiments of the present disclosure.

The neural network architecture for the domain-specific ML models is shown in FIG. 21. Separate model weights are obtained by training on each dataset and knowledge acquisition parameters (controlling the level of compression) using Keras. The input to the neural network is the flattened per-pixel local entropy features of the 64×64 image blocks. The entropy of a pixel is defined as the number of bits required to represent the local grey-scale distribution of a defined neighborhood. A higher entropy value is correlated to higher diversity and higher information density. A neighborhood of 5 pixels is used to train the models. In FIGS. 19A-19B, the visual representation of the entropy feature of a sample image is illustrated. The output of the neural network domain-specific point prediction model is used to compute the entry in the common pattern dictionary that is to be assigned for the input image block.

For both the building crack detection and forest fire detection tasks, astatically generated point spray pattern dictionary is used containing 4096 entries such that entry i has exactly i points sprayed randomly in a 64×64 block. Hence using an entry with a high value of i is equivalent to capturing more information in the image block.

TABLE 3

| | Fire DS | | | Crack DS | | |
|---|---|---|---|---|---|---|
| | Ultra Low BPP (~0.01 BPP) | | | | | |
| BPP | 0.0111 | 0.0121 | 0.0135 | 0.0137 | 0.0140 | 0.0211 |
| ACC | 84.69 | 86.00 | 86.21 | 92.86 | 93.14 | 94.68 |
| | Low BPP (~0.04 BPP) | | | | | |
| BPP | 0.0285 | 0.0437 | 0.0535 | 0.0429 | 0.0441 | 0.0459 |
| ACC | 93.46 | 94.18 | 95.25 | 97.91 | 97.92 | 97.98 |

Evaluation up to Lowest Quality Factor

Infrastructure Analysis: Two randomly sampled, disjoint sets of 2000 images are constructed for both knowledge acquisition and evaluation, respectively. 1000 images from the positive (with crack) class and another 1000 images from the negative (no crack) class are present in each of these sets. For knowledge acquisition parameters (Algorithm 1), block dimension (bDim) 64, number of iteration (iterLimit) 10, prune window size (pw) (4 and 8), grid dimension (grid) ceil((rows+cols)/20), triangle standard deviation splitting threshold (th) 5, and cb 8 are used.

The sampled 2000 evaluation images are compressed using operations according to embodiments herein with compression parameters (Algo. 4) block dimension (bDim) 64, d (1 up to 12 in separate instances), grid dimension (grid) ceil((rows+cols)/20) along with the domain-specific point prediction model (model) and the color quantization dictionary obtained. To compare with embodiments herein, the same images are compressed with JPEG 2000 and WebP from QF 1 to 10.

A separate dataset is obtained for each of JPEG 2000, WebP, and settings according to embodiments herein (also referred to herein without limitation as MAGIC). FIGS. 22A, 22B, 22C, 22D show sample images from the compressed datasets. For each dataset, the features are extracted from the second fully connected (fc2) layer of pretrained VGG-16 to train and test a support vector machine for the classification task using 30-fold cross-validation (20/80 test/train splits). From FIG. 18A, embodiments herein were able to compress beyond JPEG 2000 QF=1 while maintaining almost similar classification accuracy. The images for embodiments herein in the dataset compressed with d=12 and pw=8 are on average 22.09× smaller (1.06% accuracy loss) than source dataset (ACC=98.97%, BPP=0.9479), 2.51× smaller (0.24% accuracy loss) than JPEG 2000 QF=1 (ACC=98.15%, BPP=0.1080), and 1.98× smaller (1.69% accuracy loss) than WebP QF=1 (ACC=99.60%, BPP=0.0851).

Forest Surveillance: FIGS. 20A, 20B, 20C, 20D illustrate a comparison of source, and compressed fire detection images according to WebP, JPEG 2000, and embodiments herein. From the forest fire dataset, 643 are extracted images of which 227 have fire and 416 have no fire. Images which are not relevant to forests are ignored. 20 images are used from the dataset (10 from each class) to perform the knowledge acquisition procedure. As knowledge acquisition parameters (Algorithm 1) block dimension (bDim) 64, number of iteration (iterLimit) 10, prune window size (pw) (5 and 8), grid dimension (grid) ceil((rows+cols)/20), triangle standard deviation splitting threshold (th) 5 and cb 8 are used. The domain-specific point prediction model is trained in the same manner as for the infrastructure analysis task. The remaining 623 images (excluding the knowledge acquisition learning set) using compression parameters (Algorithm 4) block dimension (bDim) 64, d (1 through 12), grid dimension (grid) ceil((rows+cols)/20) along with the domain-specific point prediction model (model) and the color quantization dictionary obtained from the knowledge acquisition stage.

A separate dataset is obtained for each JPEG 2000 (QF 1 to 10), WebP (QF 1 to 10), and settings for embodiments herein (see FIGS. 20A-20D). The features for each dataset similar to the building crack dataset are extracted and classification is carried out using a support vector machine with 30-fold cross-validation (20/80 test/train splits). As seen in FIG. 18B, the same trend from the previous dataset is observed. The images compressed according to embodiments herein with d=8 and pw=8 are on average 42.65× smaller (2.99% accuracy loss) than source dataset (ACC=97.17%, BPP=1.864), 2.32× smaller (1.20% accuracy loss) than JPEG 2000 QF=1 (ACC=95.38%, BPP=0.1014), and 5.85× smaller (3.18% accuracy loss) than WebP QF=1 (ACC=97.36%, BPP=0.2559).

Evaluation Beyond Lowest Quality Factor

WebP and JPEG 2000 are unable to compress beyond QF=1 without some level of pre-processing. On the other hand, embodiments herein naturally can achieve a very large compression range. In Table 3, embodiments herein at extreme levels of compression using smaller cb bit sizes. Embodiments herein can compress ~167× more than source at ~13% accuracy loss for the fire dataset and ~69× more than source at ~6% accuracy loss for the building crack dataset. Depending on the application requirements, embodiments herein can gracefully trade-off accuracy for lower BPP using the parameters exposed to the user. This extreme level of compression is possible due to the ability for embodiments herein to leverage domain knowledge.

Time & Energy Analysis

Embodiments herein can achieve a higher compression rate while still performing well when it comes to coarse-grained machine vision classification tasks. To explore the potential energy savings of compression according to embodiments herein, a threshold, C/T Cutoff, may be evaluated for determining the sufficient computation and transmission energy consumption ratio beyond which embodiments herein will be beneficial for overall energy consumption in a given resource-constrained computing system. With C/T Cutoff, the time it takes to compress an image is compared with the resulting new image size. The C/T Cutoff for the present compression (for a specific set of parameters) can be computed using the Equation 1 where $E_1$ is the average encoding time for embodiments herein, $E_2$ is the average encoding time of the conventional method (JPEG 2000, WebP), $I_1$ is the average image size of for embodiments herein, $I_2$ is the average image size of the competitor method (JPEG 2000, WebP) and f is the CPU clock frequency. The resulting calculation, in clock cycles per byte, provides a comparison point between two compression techniques relating the energy required to compress an image and the energy required to transmit the compressed image. As an example, two compression techniques $C_1$ and $C_2$ are evaluated, with $C_1$ taking on average 2 sec and resulting in 25 byte images and $C_2$ taking 1 sec on average and resulting in 50 byte images. Using Equation 1 and a system with 3 GHz clock, we get a C/T Cutoff of 120. The setup time during encoding is due to loading the libraries and initializing the Python environment. In an amortized analysis for a batch operation, the setup time can be considered negligible. For compression according to embodiments herein (for a specific set of parameters) to save energy when compared to other compression standards, the operating device must have a C/T value greater than C/T Cutoff for embodiments herein. In Tables 4-5, the C/T Cutoffs are observed for different compression settings (e.g., for embodiments herein) for the building crack detection and forest fire detection datasets, respectively. We use f=3.7 GHz for computing the C/T cutoff values. Any device with C/T value greater than the cutoff will benefit (in terms of operational power consumption) from using embodiments herein with respect to the method being compared against (JPEG 2000, WebP). For example, in Table 5, with embodiments herein (pw=8, cb=2, d=1) the JPEG 2000 (JP2K) C/T cutoff is 0.492. Therefore, for embodiments herein to be more energy-efficient than JPEG2000 compression in a given system, the energy for transmitting 1 byte of image data must be greater than the energy for executing 492000 clock cycles.

$$C/T\_Cutoff = \left\| \frac{E_1 - E_2}{I_1 - I_2} \right\| * f \qquad (1)$$

Variation in Compression Ability

Figure 24:
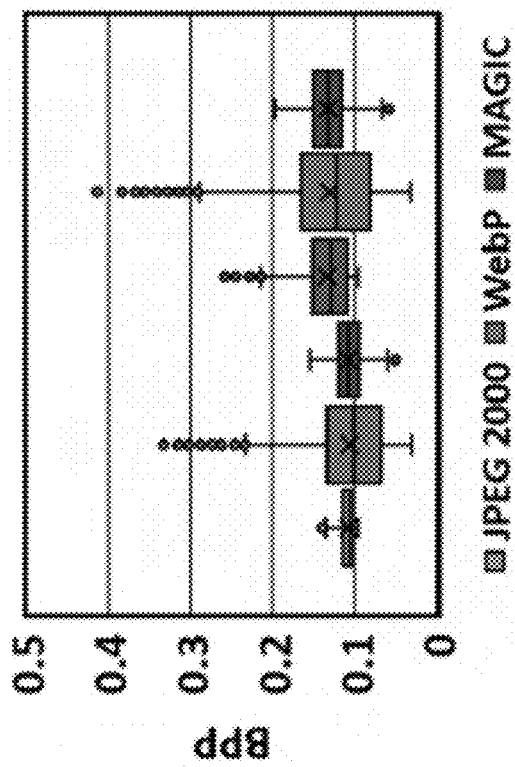
FIGS. 23-24 illustrate box plots showing variation of BPP for sampled distributions for images compressed using JPEG 2000, WebP and embodiments herein.
Figure 23:
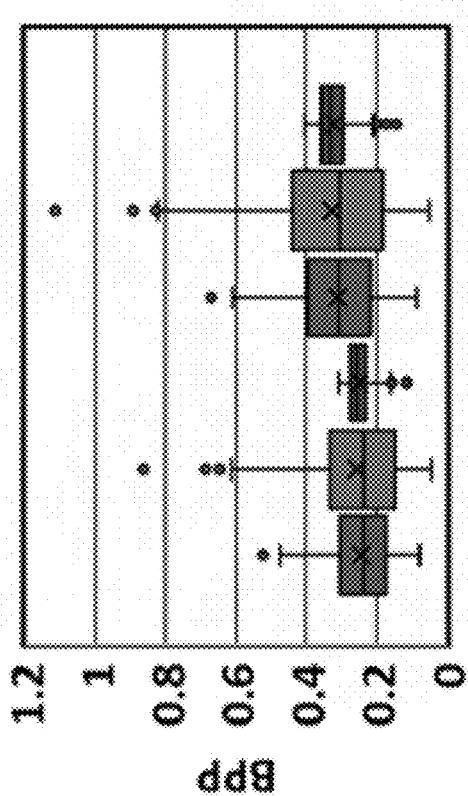

The image compression technique being used must generate images of less size variability for maintaining consistent overall system performance. Images are compressed using JPEG 2000, WebP and embodiments herein to generate box plots showing the variation of BPP for the sampled distributions in FIGS. 23-24. Embodiments herein provide low variation in BPP as compared to JPEG 2000 and WebP images. Due to different parameters in the knowledge acquisition and encoding phase, specifically pw, embodiments herein have fine control over the compressed image size. Hence, embodiments herein can provide steady performance even in biased scenarios, where other techniques may not give good compression.

Improving Prediction Accuracy

Post-processing the images compressed according to embodiments herein or using a more powerful pattern prediction model can improve the prediction accuracy by about 1-2%. Images compressed using embodiments herein consist of triangulation artifacts. One way to remove the artifacts is to recursively subdivide the triangles and compute the approximate color of each sub triangle based on the colors of the triangle and its neighbors. Using this technique, the classification accuracy is increased. However, there may be extra computation due to post-processing in the decoder end. If the decoder system resides in the cloud, then this step can be considered to squeeze out extra performance.

As explained earlier, entropy features may be used for training and neural network models, but VGG-16 fc2 features may perform slightly better. Using a VGG inspired large convolution neural network for carrying out the domain-specific point prediction task also may improve the performance slightly. However, the use of simple entropy features and a small neural network may boost speed, and help reduce energy consumption and space requirements. In an application where time, space, and energy are not constrained, one can opt for more complex feature extraction methods and larger neural network architectures for domain-specific point prediction.

Time Complexity and Performance Improvements

Time complexity analysis of encoder (Algorithm 4) and decoder (Algorithm 5) algorithms simplify to O(N+M log M+TR). The major contributors in encoding are O(N) for tiling (line 2), O(M log M) for DT (line 14), and O(TR) for triangle color calculation (line 17, the pixels associated with a triangle are determined by searching in a rectangle circumscribing the triangle), where N is the number of pixels in the image, M is the number of points sprayed, T is the number of triangles, and R is the dimension of the bounding rectangle of the biggest triangle. For decoding, the contributors are O(N) for predicted point absolute position computation (lines 6-8), O(MlogM) for DT (line 12), and O(TR) for triangle color assignment/drawing (line 17). In both algorithms, we expect the O(M log M) DT step to consume the most time.

Time complexity analysis of the knowledge acquisition algorithm (Algorithm 1) simplifies to O(KN log N+KIM log M+KITR+SVC+PQ). The major contributors are O(KN log N) for canny edge detection for all K images (line 7), O(KIM log M+KITR) for the split operation across all K images (line 11), O(SVC) for color dictionary computation using k-means algorithm (line 29) and, O(PQ) for training the point prediction model (line 30). N, M, T, R hold the same meaning as before and additionally K is the number of images in the imgList, I is the iterLimit, S is the iteration limit for k-means algorithm, V is the number of points in the colorFreq map, C is the number of centroids specified for k-means, P is the number of training samples in trainX and trainY, Q is the number of training epochs for the point prediction model.

The runtime performance of both decoder and encoder can be improved through parallelization, hardware implementation and code tweaking. Many of the block operations such as block feature extraction and point spray pattern prediction can be easily parallelized. Hardware implementation may provide speed up and may help reduce energy consumption as well.

Manual Region-of-Interest Guided Compression

Figures 25A, 25B:
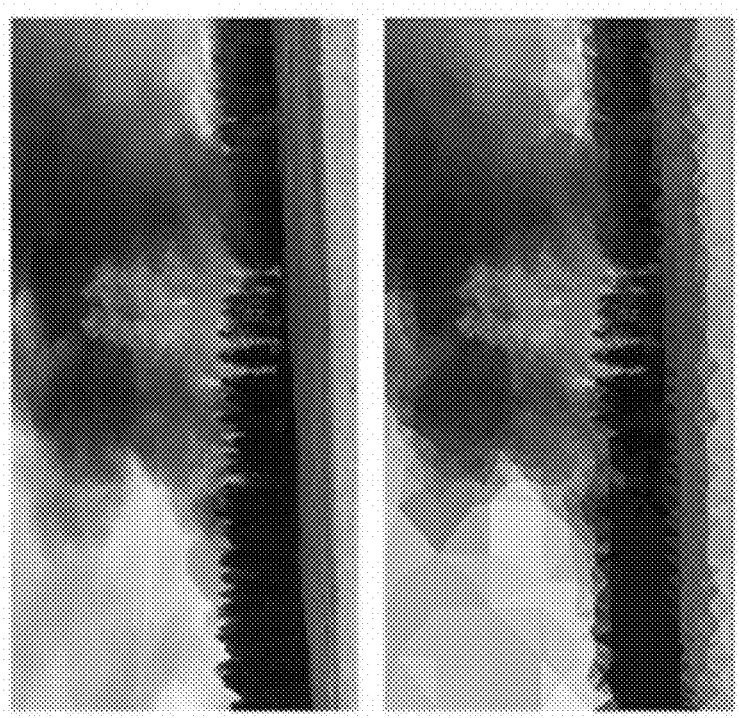
FIGS. 25A-B illustrate Region-of-Interest guided compression according to embodiments of the present disclosure.

FIGS. 25A-B illustrate Region-of-Interest guided compression according to embodiments of the present disclosure. As previously described, ROI bias can be automatically captured by training the pattern prediction model with supervised images. Beyond learning the region-of-interest bias, embodiments herein offer manual ROI based compression. With this feature, users can specify additional regions of an image that can be retained at a higher quality. In FIGS. 25A-B, an example ROI-guided image compression is provided where the fire region is designated manually as a region-of-interest. It is noted that the image region with the fire maintains much higher information than the remaining regions.

Depending on the sampling rate of the image sensor, it is observed that, adjacent video frames have very little content difference. Taking this into consideration, more can be saved in terms of space, computation and transmission. The two main components of an encoded image according to embodiments herein are the labelsArr and the colorDict. Frame[N] can be represented by reusing the colorDict and the labelArr of frame[N−1]. In Equation 2, OP is the set of obsolete point spray patterns which are no longer present in the new frame and NP is the set of new point spray patterns which are introduced in the new frame. Similarly, as shown in Equation 3, the colorDict[N−1] can be modified by removing the obsolete triangle colors and introducing the colors of the new triangles in frame N.

$$\text{labelsArr}[N]=\text{labelsArr}[N-1]-OP+NP \quad (2)$$

$$\text{colorDict}[N]=\text{colorDist}[N-1]-OC+NC \quad (3)$$

TABLE 4

| Data<br>Compression Parameters | MAGIC | | | | Source | JP2K<br>QF-1 | WebP<br>QF-1 |
| --- | --- | --- | --- | --- | --- | --- | --- |
| | pw = 8<br>cb = 2<br>d = 1 | pw = 8<br>cb = 8<br>d = 2 | pw = 4<br>cb = 8<br>d = 10 | pw = 4<br>cb = 8<br>d = 2 | — | | |
| Avg BPP | 0.012 | 0.038 | 0.039 | 0.046 | 0.947 | 0.108 | 0.085 |
| Avg Size (Byte) | 81.83 | 248.5 | 257.2 | 301.0 | 8351 | 696.0 | 548.89 |
| Encode + Setup Time (sec) | 1.706 | 1.683 | 0.717 | 1.719 | 0 | 0.0083 | 0.0199 |
| Encode Time (sec) | 0.090 | 0.098 | 0.101 | 0.103 | 0 | 0.0083 | 0.0199 |
| Decode Time (sec) | 0.018 | 0.016 | 0.017 | 0.018 | 0 | 0.0106 | 0.0219 |
| Detection Accuracy (%) | 91.89 | 97.52 | 97.18 | 97.53 | 98.97 | 98.15 | 99.6 |
| C/T Cutoff Source (1 × 10^6 CC/Byte) | 0.040 | 0.044 | 0.046 | 0.047 | — | — | — |
| C/T Cutoff JP2K-QF1 (1 × 10^6 CC/Byte) | 0.492 | 0.741 | 0.781 | 0.887 | — | — | — |
| C/T Cutoff WebP-QF1 (1 × 10^6 CC/Byte) | 0.555 | 0.961 | 1.028 | 1.240 | — | — | — |

TABLE 5

| Dataset<br>Compression Parameters | MAGIC | | | | Source | JP2K<br>QF-1 | WebP<br>QF-1 |
|---|---|---|---|---|---|---|---|
| | pw = 8<br>cb = 8<br>d = 12 | pw = 8<br>cb = 8<br>d = 4 | pw = 8<br>cb = 8<br>d = 3 | pw = 8<br>cb = 8<br>d = 1 | | | |
| Avg BPP | 0.019 | 0.029 | 0.034 | 0.074 | 1.864 | 0.101 | 0.013 |
| Avg Size (Byte) | 431.3 | 658.0 | 771.2 | 1675 | 44102 | 2282 | 5756 |
| Encode + Setup Time (sec) | 1.830 | 1.841 | 1.890 | 1.885 | 0 | 0.0097 | 0.036 |
| Encode Time (sec) | 0.261 | 0.272 | 0.281 | 0.315 | 0 | 0.0097 | 0.636 |
| Decode Time (sec) | 0.032 | 0.034 | 0.035 | 0.039 | 0 | 0.0209 | 0.084 |
| Detection Accuracy (%) | 90.56 | 92.72 | 93.2 | 94.92 | 97.17 | 95.38 | 97.36 |
| C/T Cutoff Source ($1 \times 10^6$ CC/Byte) | 0.022 | 0.023 | 0.023 | 0.027 | — | — | — |
| C/T Cutoff JP2K-QF1 ($1 \times 10^6$ CC/Byte) | 0.502 | 0.597 | 0.664 | 1.860 | — | — | — |
| C/T Cutoff WebP-QF1 ($1 \times 10^6$ CC/Byte) | 0.156 | 0.171 | 0.181 | 0.252 | — | — | — |

CONCLUSION

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A method for joint compression and encryption, the method comprising:
   retrieving, by a first computing entity, an image file comprising a first plurality of segments;
   identifying, by the first computing entity and for each segment of the first plurality of segments, one or more matching segments in a local segmentation repository;
   compressing, by the first computing entity, remaining segments of the first plurality of segments for which no matching segment was identified into a compressed remaining segment set; and
   transmitting, by the first computing entity, via an unsecure communication channel and to a second computing entity, identifications of the one or more matching segments and the compressed remaining segment set.

2. The method of claim 1, further comprising, prior to retrieving the image file:
   generating, by the first computing entity, a segmentation repository by:
      applying a machine learning algorithm to a plurality of image files, wherein the machine learning algorithm is trained to identify repeated segments in the plurality of image files; and
      adding the repeated segments to the segmentation repository, the segmentation repository comprising a second plurality of segments;
   generating, by the first computing entity, a color quantization repository, using the machine learning algorithm, based at least in part on one or more colors of the second plurality of segments, wherein the color quantization repository comprises a plurality of identifications associated with the second plurality of segments;
   encoding, by the first computing entity, each identification of the plurality of identifications based on a count of the one or more colors; and
   transmitting, by the first computing entity, via a secure communication channel and to the second computing entity, one or more of the segmentation repository, the color quantization repository, or the machine learning algorithm.

3. The method of claim 2, further comprising:
   determining, by the first computing entity and using the machine learning algorithm, one or more textural contents in a training dataset; and storing, by the first computing entity, the one or more textual contents in a textual content segment in the segmentation repository.

4. The method of claim 2, wherein the machine learning algorithm comprises an unsupervised pattern clustering algorithm.

5. The method of claim 2, further comprising:
responsive to determining that, for at least one segment of the image file, there is not a matching segment in the segmentation repository, identifying, by the first computing entity, a substantially matching segment in the segmentation repository, wherein the substantially matching segment comprises at least one of a color substantially matching a color of the at least one segment, a hue substantially matching a hue of the at least one segment, a pattern substantially matching a pattern of the at least one segment, or a texture substantially matching a texture of the at least one segment.

6. The method of claim 2, wherein the second computing entity decodes
the encoded identifications into decoded segments based at least in part on one or more of the segmentation repository, the color quantization repository, or the machine learning algorithm, and wherein the second computing entity retrieves
the image file based on the decoded segments and the compressed remaining segment set.

7. The method of claim 6, wherein the second computing entity, using the machine learning algorithm, performs an image enhancement after recovery of the image file.

8. The method of claim 2, wherein generating, by the first computing entity, a segmentation repository by applying the machine learning algorithm to a plurality of image files comprises:
predicting a spray pattern for each identified segment;
performing an edge detection for each spray pattern;
designating a spray point to each edge;
triangulating the spray points into a plurality of triangles by connecting each set of three spray points in each spray pattern;
iteratively dividing each triangle of the plurality of triangles that comprises a variation in texture, wherein the iteratively dividing comprises designating a point in a barycenter; and
decoding the image file based on locations of the spray points and colors of each triangle of the plurality of triangles.

9. The method of claim 8, further comprising:
detecting, by the first computing entity, one or more regions of interest on the image file;
designating, by the first computing entity, an additional point to each edge of the one or more regions of interest; and
triangulating, by the first computing entity, the additional point and the spray points.

10. The method of claim 8, further comprising:
determining, by the first computing entity and using the machine learning algorithm, a color of a triangle based on one or more colors of each adjacent triangle; and
decoding, by the first computing entity, the image file based on locations of the spray points and colors of each triangle.

11. The method of claim 9, wherein the one or more regions of interest comprises one or more of one or more objects, one or more edges, or one or more recognized faces.

12. The method of claim 2, wherein the machine learning algorithm is used to determine the remaining segments of the second plurality of segments for compressing.

13. The method of claim 2, wherein the machine learning algorithm is used for one or more of: identifying the one or more matching segments in the segmentation repository, predicting a point spray pattern, identifying a substantially matching segment in the segmentation repository, or detecting one or more regions of interest on the image file.

14. The method of claim 1, further comprising:
encrypting, by the first computing entity, the one or more matching segments, using a key, into an encrypted segment set; and
transmitting, by the first computing entity, the key to the second computing entity.

15. The method of claim 14, wherein the second computing entity, using the key, decrypts the encrypted segment set.

16. The method of claim 2, further comprising:
responsive to retrieving a plurality of image files, compressing, by the first computing entity, remaining segments of the second plurality of segments of each of image files for which no matching segment was identified into a compressed remaining segment set, wherein the compressing is performed based at least in part on a differential data of one or more preceding image files.

17. The method of claim 1, wherein the compressing is performed in one of a time domain, a frequency domain, or a joint time-frequency domain.

18. The method of claim 1, wherein data deemed unnecessary for analysis by an artificial intelligence computing entity is maintained at a low level of quality.

19. The method of claim 1, wherein only those segments required for analysis by an artificial intelligence computing entity are maintained.

20. A joint compression and encryption system comprising a first computing entity, the first computing entity comprising at least one processor and at least one memory storing instructions that, with the at least one processor, cause the first computing entity to:
retrieve an image file comprising a first plurality of segments;
identify, for each segment of the first plurality of segments, one or more matching segments in a local segmentation repository;
compress remaining segments of the first plurality of segments for which no matching segment was identified into a compressed remaining segment set; and
transmit, via an unsecure communication channel and to a second computing entity, identifications of the one or more matching segments, and the compressed remaining segment set.

21. The joint compression and encryption system of claim 20, wherein the first computing entity is caused to, prior to retrieving the image file:
generate a segmentation repository by applying a machine learning algorithm to a plurality of image files, wherein the machine learning algorithm is trained to identify repeated segments in the plurality of image files;
add the repeated segments to the segmentation repository, the segmentation repository comprising a second plurality of segments; generating a color quantization repository, using the machine learning algorithm, based at least in part on one or more colors of the second plurality of segments, wherein the color quantization repository comprises a plurality of identifications associated with the second plurality of segments;
encode each identification of the plurality of identifications based on a count of the one or more colors; and
transmit, via a secure communication channel and to the second computing entity, one or more of the segmentation repository, the color quantization repository, or the machine learning algorithm.

22. The joint compression and encryption system of claim 20, wherein the first computing entity is caused to:
encrypt the one or more matching segments using a key into an encrypted segment set; and
transmit the key to the second computing entity.

23. The joint compression and encryption system of claim 22, wherein the second computing entity, using the key, decrypts the encrypted segment set.

* * * * *